United States Patent

Borza et al.

[11] Patent Number: 5,991,431
[45] Date of Patent: Nov. 23, 1999

[54] MOUSE ADAPTED TO SCAN BIOMETRIC DATA

[75] Inventors: Stephen J. Borza; Michael A. Borza; Neil Teitelbaum, all of Ottawa, Canada

[73] Assignee: Dew Engineering and Development Limited, Ottawa, Canada

[21] Appl. No.: 08/797,057

[22] Filed: Feb. 12, 1997

Related U.S. Application Data

[63] Continuation-in-part of application No. 08/760,212, Dec. 4, 1996, Pat. No. 5,859,420
[60] Provisional application No. 60/011,459, Feb. 12, 1996.

[51] Int. Cl.$^6$ .............................. G06K 9/24; G06K 9/46; G09G 5/08
[52] U.S. Cl. .................. 382/127; 382/314; 345/164; 463/37
[58] Field of Search ...................................... 382/115, 116, 382/119–123, 124–127, 314; 356/71; 340/825.34; 345/163–167, 161; 463/37; 364/190, 709.06, 709.05

[56] References Cited

U.S. PATENT DOCUMENTS

| | | | |
|---|---|---|---|
| 4,210,899 | 7/1980 | Swonger et al. | 382/125 |
| 5,163,154 | 11/1992 | Bournas et al. | 395/775 |
| 5,229,764 | 7/1993 | Matchett et al. | 340/825 |
| 5,325,442 | 6/1994 | Knapp | 382/124 |
| 5,546,471 | 8/1996 | Merjanian | 382/124 |
| 5,578,817 | 11/1996 | Bidiville et al. | 250/221 |
| 5,596,454 | 1/1997 | Hebert | 359/726 |
| 5,621,516 | 4/1997 | Shinzaki et al. | 356/71 |
| 5,812,252 | 9/1998 | Bowker et al. | 356/71 |
| 5,838,306 | 11/1998 | O'Connor et al. | 345/163 |

OTHER PUBLICATIONS

Alan Freedman, *The Computer Desktop Encyclopedia*, AMACOM, p.p. 555, , ISBN 0–8144–0012–4, 1996.
Anthony Ralston, Edwin D. Reilly, Jr., *Encyclopedia of Computer Science and Engineering*, Van Nostrand Reinhold Company, pp. 998–1002, ISBN 0–442–24496–7, 1983.
Catalog: Melles Griot, *Optics Guide 5*, pp. 1–2 to 1–5, 1990.
Sybil P. Parker, *Dictionary of Scientific and Technical Terms*, McGraw–Hill, 1989, p.p. 84, 1194, ISBN 0–07–045270–9.

*Primary Examiner*—Leo H. Boudreau
*Assistant Examiner*—Brian Werner
*Attorney, Agent, or Firm*—Neil Teitelbaum & Associates

[57] ABSTRACT

In the past, contact imaging devices were large and costly. It has been proposed that for contact imaging device adoption for the personal computing market, cost and size must be reduced. In an attempt to address these concerns, a biometric pointing device such as a mouse is presented incorporating therein a contact imager. The contact imager fits within a small enclosure. Further, data transmission means within the mouse provides a signal to a single port on a computer indicative of the output data from both the contact imaging means and the pointing device.

9 Claims, 27 Drawing Sheets

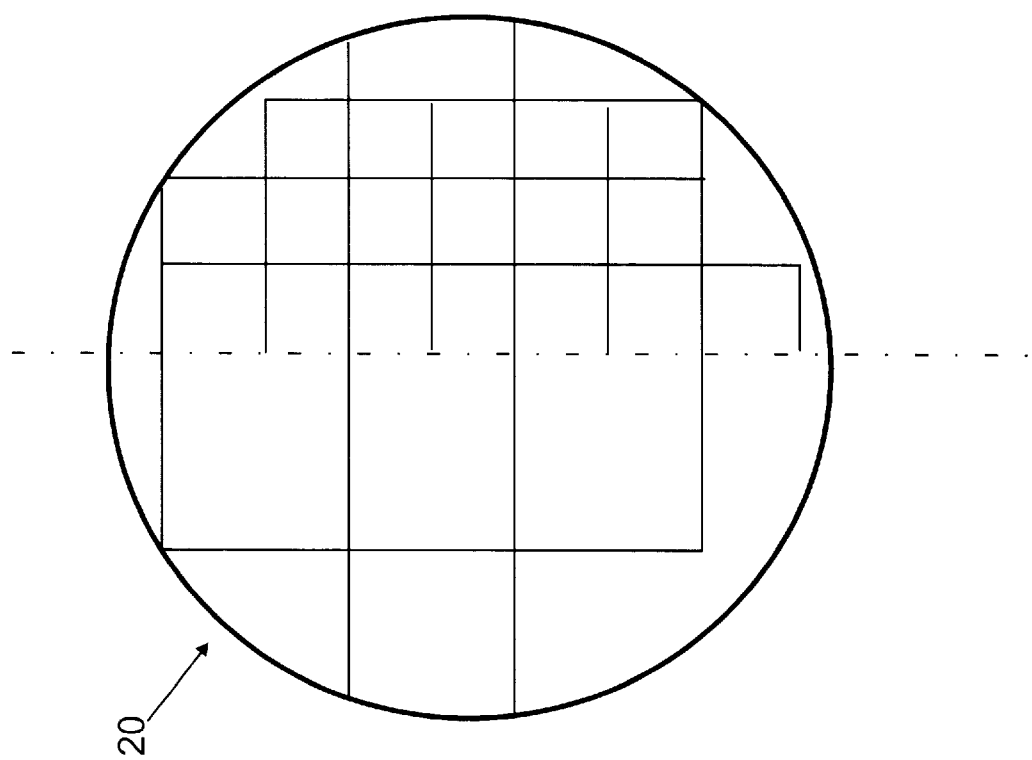

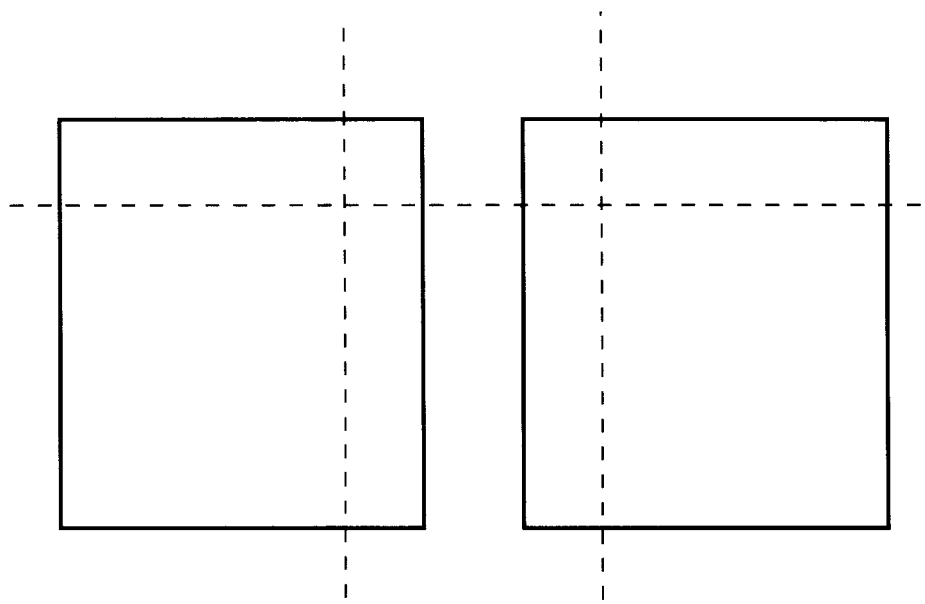

MOUSE ADAPTED TO SCAN BIOMETRIC DATA

This application claims the benefit or U.S. Provisional Application No. 60/011,459, filed on Feb. 12, 1996. This is a continuation in part of U.S. patent application Ser. No. 08/760,212, filed Dec. 4, 1996 now U.S. Pat. No. 5,859,420.

FIELD OF THE INVENTION

This invention relates to fingerprint identification, and in particular to an apparatus therefor included within a pointing device or computer housing adjacent a trackball.

DESCRIPTION OF THE PRIOR ART

Various optical devices are known which employ prisms upon which a finger whose print is to be identified is placed. Generally these systems rely on suitable optical components and adequate light for imaging. Imaging devices often include a prism that has a first surface upon which a finger having print to be detected is placed. A second surface is disposed at an acute angle to the first surface through which the fingerprint is viewed and a third illumination surface through which light is directed into the prism. In some cases, the illumination surface is at an acute angle to the first surface, as seen for example, in U.S. Pat. Nos. 5,187,482 and 5,187,748. In other cases, the illumination surface is parallel to the first surface, as seen for example, in U.S. Pat. Nos. 5,109,427 and 5,233,404.

As fingerprint identification systems are becoming more in demand, their presence is increasing. One of the more basic and simple systems is described in U.S. Pat. No. 5,187,748 as prior art FIG. 1a. For example, personal computer systems have been envisaged having fingerprint identification systems coupled to them for verifying authorised users, before access to a computer or computer system is given. Generally, fingerprint input devices tend to be quite bulky, large, and costly.

It has been proposed that in theory, a smaller contact imaging device for inclusion in a mouse or joystick is preferable to those currently available. Further, with the emerging computer market, it has been proposed that these smaller contact imaging devices be incorporated into existing computer peripherals such as pointing devices or keyboards. In U.S. Pat. No. 5,229,764 to Matchett et al., a computer mouse is shown in FIGS. 8a and 8b of that patent. The function of the mouse is described briefly and incorporates a thumbscan sensor and a thumbscan processing unit separate from the computer and from the pointing device. The need for extra modules or units, renders such a system complex and expensive. Matchett, in describing a joystick incorporating a thumbscan sensor, discloses the use of two cables to the computer—it is assumed that one is for providing joystick data to a games port and the other is for providing thumbscan data to a thumbscan processing unit. For a joystick intended to rest on a surface, this may be a suitable solution; unfortunately, in home use, often joysticks are moved for comfort and for storage while not in use. Two cables are likely to become tangled or get caught.

For the mouse incorporating a thumbscan unit, Matchett indicates that, "A mouse lead PE is modified, or replaced, to carry both mouse data and the sensor data." No description of this modification is presented. In light of the disclosure of Matchett, it may indicate including two sets of wires or two cables within a single cable connecting a mouse to a computer via two connectors—therefore, splitting the cable proximate the computer into two separate cables—or, alternatively, through a proprietary interface. This understanding is reinforced with reference to FIG. 8b wherein Matchett discloses the use of a "same conduit" for carrying the leads of the thumbscan device. The use of a single conduit is significant in preventing tangled mouse cables etc. Unfortunately, the Matchett reference does not teach an apparatus or method of designing or constructing a computer mouse incorporating a biometric sensor other than a sketch and suggestion that a thumbscan unit can be incorporated into a mouse.

In the past, optical devices were interfaced with computers through the use of frame grabbers or custom circuits. An optical imaging device such as a video camera or a fingerprint sensor was provided with an opto-electronic component such as a charge coupled device (CCD) capable of transforming optical information in the form of images into electrical signals in the form of analogue output signals. Often, these signals correspond to existing standards such as RS170, NTSC or PAL.

One popular use of this technology is in video cameras. A video camera comprises a lens, a CCD, and transformation circuitry. The camera is also provided with recording and playback means. In use, the CCD transforms an image presented to it through the camera lens into an electrical signal. The electrical signal is transformed to correspond with a predetermined analog video standard and is provided to an output port of the camera. Such an output signal is capable of being displayed on a television or on a security monitor. This output signal is also capable of being displayed or imported into a computer by means of a frame grabber.

Frame grabbers are known and are widely used. A frame grabber is designed to accept an analog video signal and convert same into a digital representation of a frame or a plurality of frames. Such a device converts a predetermined video signal from an analog signal to a digital bit map signal through the use of an analog to digital converter, synchronization circuitry, gray level recovery circuitry, sequencing and control logic, and an interface to a computer bus. Such frame grabbers are often designed to be coupled with a personal computer and interface with the computer bus in the form of a NUBUS, ISA, PCI, or VLB bus. Typically, these frame grabbers require opening a PC's protective housing for installation and removal. Further, such frame grabbers are costly.

Electro-optical devices for use as biometric input devices such as fingerprint, retina, or palm scanners are known. In a fingerprint input transducer or sensor, the finger under investigation is usually pressed against a flat surface, such as a side of a glass plate, and the ridge and valley pattern of the finger tip is sensed by a sensing means such as an interrogating light beam. Fingerprint identification devices of this nature are generally used to control the building-access or information-access of individuals to buildings, rooms, and devices such as computer terminals.

The widespread use of personal computers and advances in processor power make them a suitable choice for many applications. Further, the expandability of some personal computers allows for the design and installation of peripherals enhancing functionality or performance. Further yet, the adoption of standard desktop interfaces for computers such as Apple Desktop Bus, RS232, X.25, Ethernet, Parallel, Universal Serial Bus, SCSI, and Appletalk render the design and implementation of desktop peripherals which are removable from a computer and adaptable across different interfaces desirable.

This invention relates to a fingerprint input device that serves both as a computer pointing device in the form of a mouse and a fingerprint input device. For this and other similar applications, it is essential for the fingerprint input device to be, very compact, durable, and preferably inexpensive. To this end, it is an object of the invention to provide a fingerprint capture device that is robust, has relatively few components and that is physically compact, being relatively short in length between the prism to a detecting array.

Fingerprint imaging devices suitable for obtaining a fingerprint image from a live subject are well known in the literature. Similarly, mouse and other pointing devices are well known, common place computer accessories in desktop computers. This invention combines both of these devices in a synergistic manner. The benefits of doing so are numerous. For example, the space required on a desktop is significantly reduced compared with that required for separate devices; the fingerprint scanning device is located in a position naturally occupied by a thumb of a user, improving the repeatability of fingerprint imaging; as the fingerprint data arrives at the host computer through the same electronic port as the normal mouse data, valuable port resources are conserved in the host computer; no special electronic hardware such as frame-grabber cards are required in the host computer to process the fingerprint data. In an application where the fingerprint-mouse-pointing device are used in combination with a screen saver to identify the user who left a computer idle for a period of time, all that is required is the user placing a hand on the mouse with a finger or thumb on the scanning window, and normal mouse control may be resumed, obviating the need to remove the users hand in going from a separate fingerprint authorisation device to a mouse, thus significantly saving time.

It is a further object of the invention to provide a relatively inexpensive device that is compact enough to be hand held, serving both as a mouse or pointing device, and a fingerprint input device. The pointing device may be in the form of a trackpad, a joystick, a pen stylus, or a conventional mouse, furthermore, it may be incorporated into a laptop computer as part of the housing, with a platen or windowed surface for receiving a finger.

SUMMARY OF THE INVENTION

It is an object of the invention to provide a fingerprint identification apparatus that is compact, relatively inexpensive and that, housed within a pointing device, focuses a fingerprint image onto a detector with acceptable clarity.

According to the invention, there is provided n apparatus for providing fingerprint imaging information and positional information for use with a computer, comprising:

a housing;

a pointing device housed within the housing and for providing a first signal in dependence upon location;

a contact imager housed within the housing and having a surface for accepting fingerprint information and for providing a second signal corresponding to detected fingerprint information; and means for accepting the first signal and the second signal and for combining information from the first signal and the second signal to provide a third signal to the computer.

In accordance with the invention there is provided an apparatus for providing fingerprint imaging information and positional information for use with a computer comprising:

a housing, the housing having therein a window or surface for receiving a finger;

contact imaging means for imaging a fingerprint placed against the surface or window and providing imaging information in dependence upon the imaging;

a relative position indicator for providing position information in dependence upon position;

means for providing a single signal to a computer in dependence upon both the position information and the imaging information.

According to yet another aspect of the invention there is provided a method of providing imaging and position information from a computer pointing device to a computer comprising the steps of:

receiving position information;

receiving image information; and, combining the image information and position information into a composite signal for provision to the computer and providing the composite signal to the computer.

BRIEF DESCRIPTION OF THE DRAWINGS

Exemplary embodiments of the invention will now be described in conjunction with the drawings, in which:

FIG. 21a is a schematic view of a semiconductor wafer, illustrating the space saving by a finer division of the wafer;

FIG. 22 is a view explaining the use of the alignment pattern;

DETAILED DESCRIPTION

Figure 1:
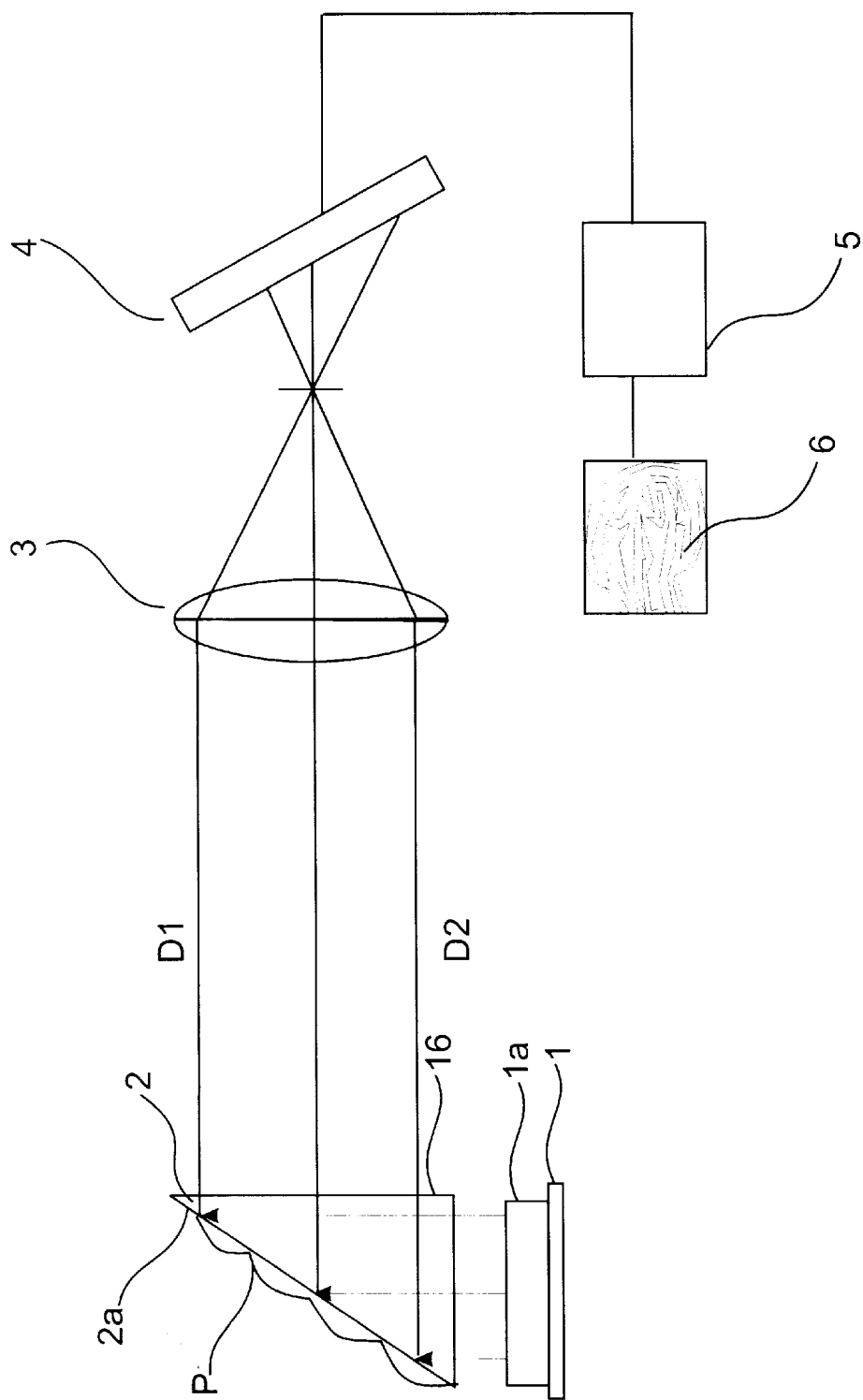
FIG. 1 is a prior art side elevation of an embodiment of an apparatus for identifying fingerprints.

Referring to FIG. 1, a schematic view shows the construction of a representative embodiment of a known type of optical apparatus. This apparatus comprises a light source 1 and a diffuser 1a for emitting a light beam to the subject fingerprint "P". A triangular prism 2 includes a slanted surface 2a of about 45 degrees inclination angle on which the fingerprint "P" is laid. An image producing lens system 3 is provided for receiving the reflected light beam from the valleys of the subject fingerprint laid on the prism 2 and then producing an image of the subject fingerprint "P" at an area charge coupled device 4 (hereinafter, referred to simply as "the area CCD") for converting the produced fingerprint image into an electric signal; the apparatus further includes an amplifying/analysing circuit 5 in the form of a signal processing circuit for amplifying then analysing the electric signal for the subject fingerprint provided by the area CCD 4, and a monitor 6 for displaying the fingerprint image shown. The transparent triangular prism 2 can be made of glass or another suitable material. Other prism shapes such as polygonal e.g. tetragonal may also be employed. The index of refraction of the prism material is preferably in the range of about 1–2.

The prism 2 has a fingerprint receiving face 2a, upon which a finger is placed (indicated by fingerprint P). Fingers are known to incorporate fingers and thumbs. A fingerprint viewing face 16 is disposed at an acute angle, typically of about 45–50°, to the fingerprint receiving face 2a. This permits a larger viewing surface and a sharper viewed image than prior art devices. Two opposed parallel faces are perpendicular to the fingerprint receiving face 2a.

The light source 1 is in the form of a multi-light emitting diode (LED) array, although other conventional light sources are also known. A suitable LED array is one of is the type described in U.S. Pat. No. 5,210,588 comprising a number of high intensity ultra-luminescence chips, which provides a light intensity of about three (3) times that of common LEDs. The disclosure of U.S. Pat. No. 5,210,588 is incorporated herein by reference.

CCD image sensors provide an electrical signal representative of a captured image. Image sensor circuit diagrams for CCD image sensors are shown for example on semiconductor data sheets provided by manufacturers of semiconductor devices such as TEXAS INSTRUMENTS. Of note is the fact that an electrical signal representative of a captured image is provided by the CCD device in analogue form. This supports standards for video such as PAL or NTSC. Unfortunately, the use of a typical image capture apparatus or circuit requires further hardware in the form of a frame grabber to operate with a computer.

Figure 2:
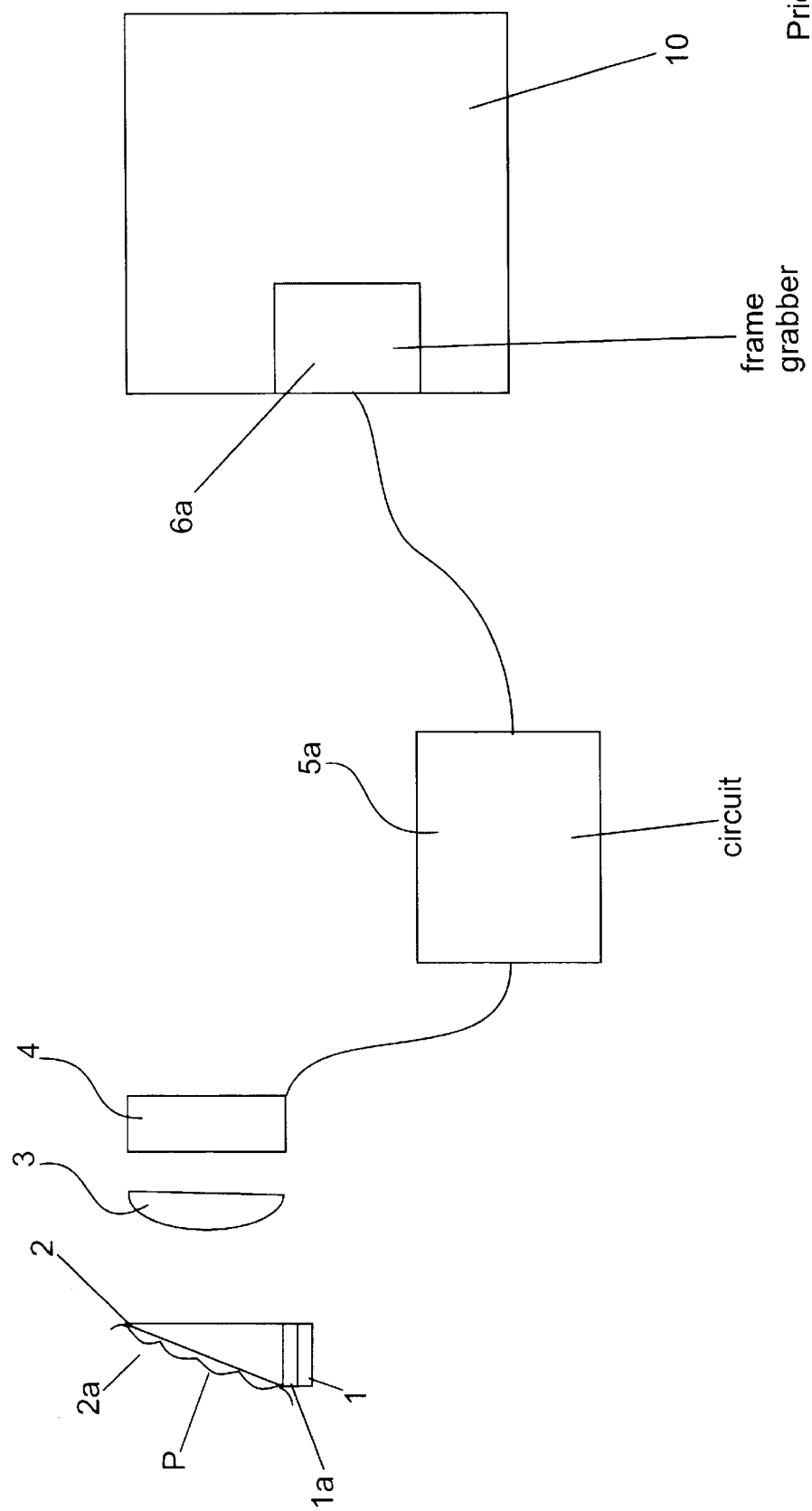
FIG. 2 is a prior art implementation of an imaging device comprising a CCD and a frame grabber.

Referring to FIG. 2, a prior art contact imaging device is shown. The optical imaging device provides an analogue output as is common in the art. The output signal is provided to a frame grabber housed within a digital computer 10. There are several drawbacks to such an implementation. First, the computer is opened to install a frame grabber which makes installation and relocation costs high. Second, the frame grabber occupies an expansion slot or port in the computer thereby reducing computer expandability. Third, the frame grabber is expensive. These drawbacks in the prior art implementations of imaging devices, also preclude transmitting pointing information such as that provided by a computer mouse and image information as a single signal or as multiplexed signals without a custom frame grabber.

This apparatus comprises a light source 1 and a diffuser 1a for emitting a light beam to the subject fingertip "P". A triangular prism 2 includes a slant surface 2a of about 45 degrees inclination angle on which the fingertip "P" is laid. Throughout the disclosure and claims, finger is defined to include a finger or a thumb. An image producing lens system 3 is provided for receiving the reflected light beam from the valleys of the subject fingerprint laid on the prism 2 and then producing an image of the subject fingerprint "P" at an area CCD 4; the apparatus further includes a signal processing circuit 5a for amplifying the electric signal provided by the area CCD 4, and a frame grabber 6a installed within a computer 10 for digitising the signal provided by the CCD and providing a digital representation of the image to the computer 10.

Figure 3:
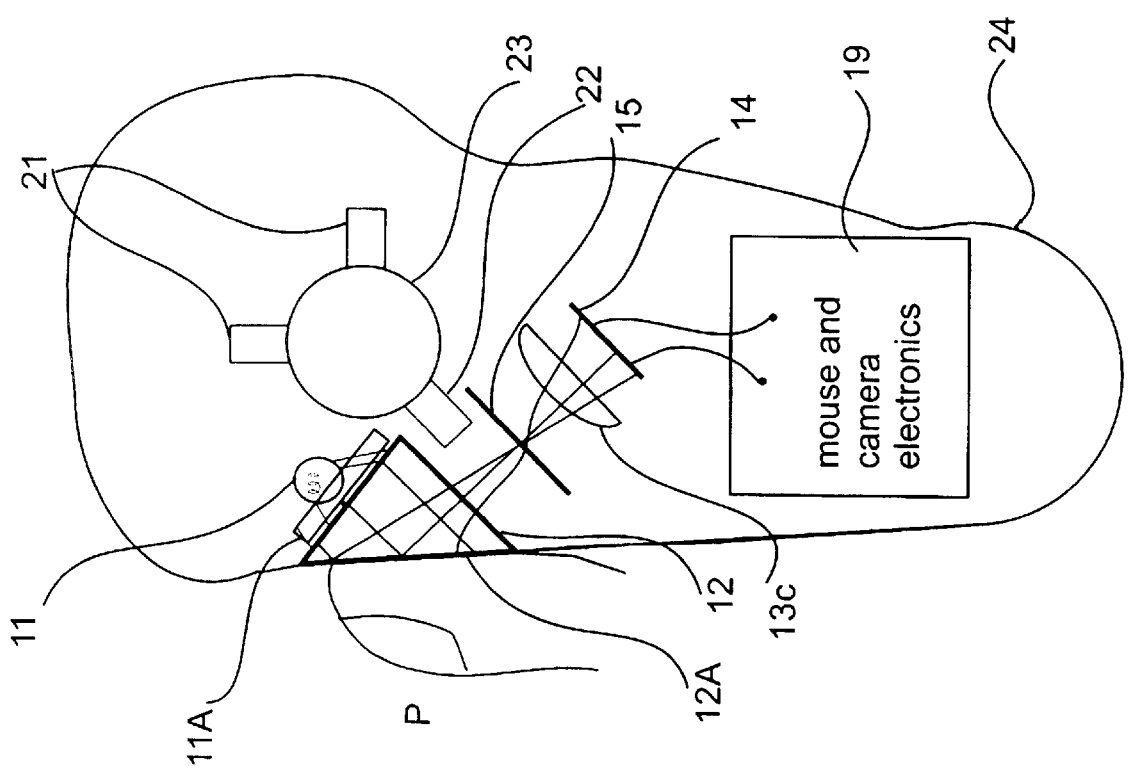
FIG. 3 is a simplified schematic diagrams of a mouse having an optical fingerprint imaging means incorporated therein.

Referring now to FIG. 3, a computer mouse 24 comprising an optical fingerprint imager according to the invention is shown. The mouse comprises a position detecting device in the form of two position sensors 21, an idler wheel 22, and a ball 23 for engaging a surface on which the mouse is placed and for rotating in relation to mouse movement along the surface. Construction and design of pointing devices is well known within the art.

Within the computer mouse 24 is housed an apparatus for imaging fingerprints. The apparatus comprises a light source 11 and a diffuser 11a for emitting a light beam to the subject fingerprint "P". A triangular prism 12 includes a slant surface 12a of about 45 degrees inclination angle on which the fingerprint "P" is laid. An iris 15 disposed between the prism and an image producing lens system 13 increases the depth of field and thereby improves image quality. The image producing lens system 13 is provided for receiving the reflected light beam from the valleys of the subject fingerprint laid on the prism 12 and then producing an image of the subject fingerprint "P" at an area CCD 14; the apparatus further includes a circuit 19 for providing a signal in dependence upon both the mouse position detecting circuit output signal and the CCD 14 output signal. The systems incorporated within the mouse of FIG. 3, are described in more detail below.

Figure 4:
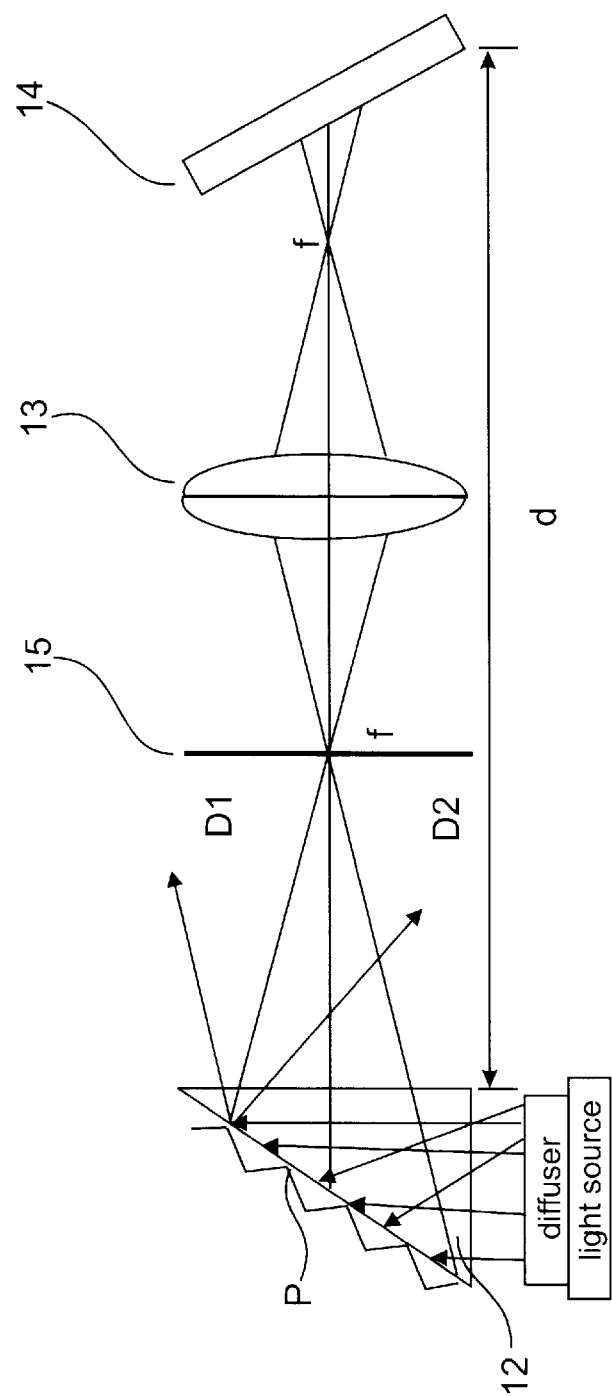
FIG. 4 is a side elevation of an embodiment of an apparatus according to the invention.

Referring to FIG. 4, an imaging device for incorporation into an embodiment of the invention is shown wherein a diaphragm is placed at the focal point of the lens to increase the depth of field and to lessen Gaussian distortion. In attempting to shorten the distance "d" between the prism 12 and the CCD detector 14 to achieve a more compact device, optical limitations of conventional fingerprint arrangements such as the one shown in FIG. 1 become more exaggerated and hence, more limiting. For example, as the distance "d" is decreased, the depth of field within the system decreases; thus the focusing requirements become more stringent. This, of course, places increased limits on acceptable tolerances of the optical components and their respective placement. Conversely, as the depth of field increases, the task of focusing a fingerprint image on a CCD array becomes less complex. One aim of this invention is to provide a compact, easy to assemble and manufacture fingerprint device. At the same time, it is also preferred to lessen the cost of such a device by using a relatively inexpensive, commercially available optical lens or optical lens arrangement. It should be noted, that the diaphragm 15, shown in FIG. 4 has an extremely small opening. In fact, it is unlikely that this opening would provide enough light for the CCD array to detect an image; however, in theory, it is preferred to have a small fixed opening with the proviso that enough light be present at the CCD array 14 to detect a suitable image. If the depth of field is not increased sufficiently to cover the difference in path lengths between D1 and D2 (see FIG. 1), the CCD 14 can be tilted to more sharply focus of the image.

Figure 5:
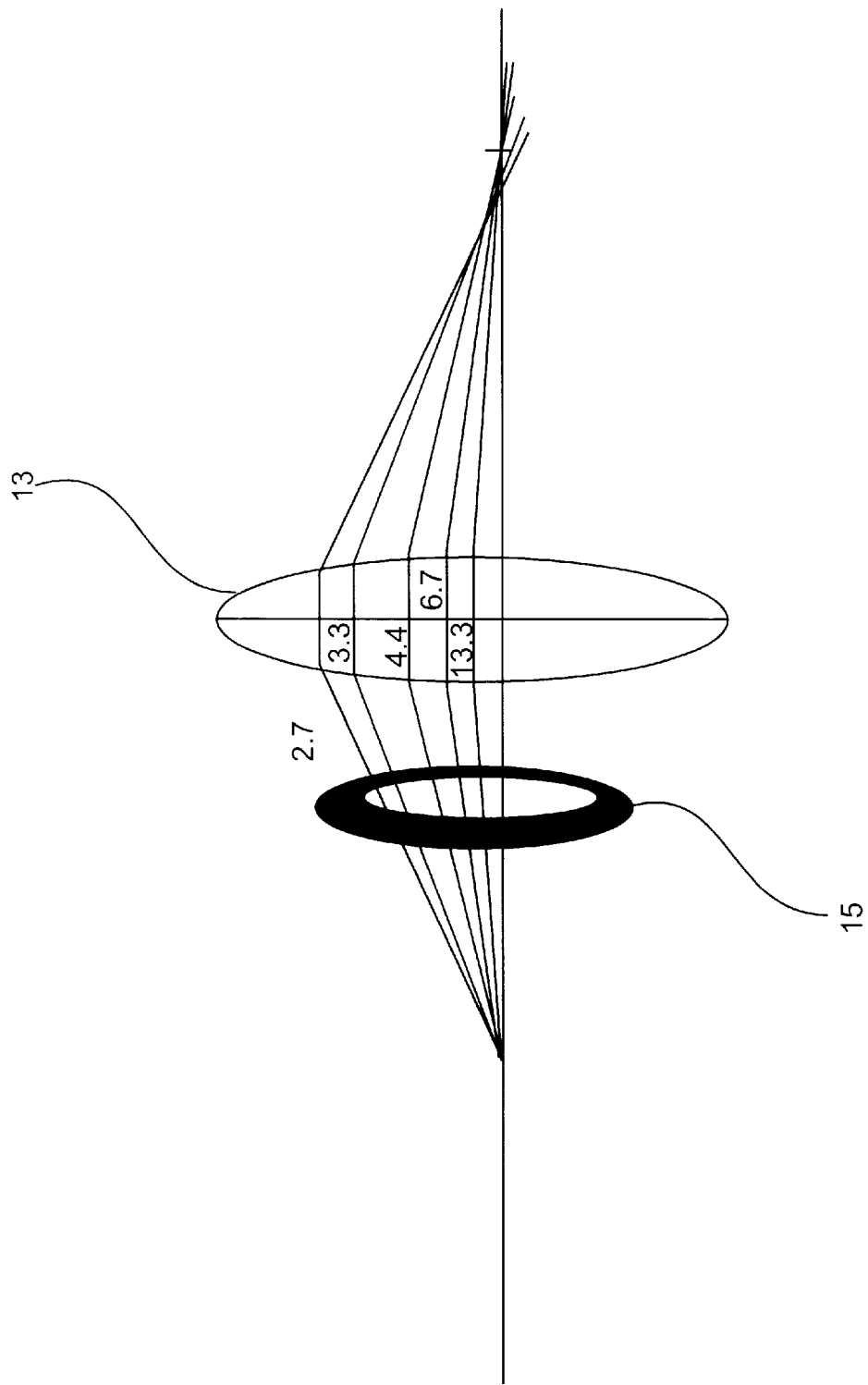
FIG. 5 is a side elevation of yet another embodiment of an apparatus according to the invention.

Referring now to FIG. 5, a symmetric bi-convex lens is shown exhibiting Gaussian optical distortion. As can be seen from the figure, light travelling through the lens at varying distances from the optical axis (various f-ray numbers) does not focus at the same point on the paraxial image plane. This aberration can cause light from a same feature area within a fingerprint being imaged, to fall on more than one pixel of the CCD, causing the print imaged by the CCD to appear blurry or out of focus. More costly achromat lenses are available which correct for this problem, however this significantly adds to the cost of manufacture of the fingerprint device. Constraining the light to within a smaller radius about the centre of the lens, i.e. eliminating low ray f-numbers results in a significant improvement in image quality detected by the CCD array. The diaphragm 15 shown in FIG. 5 essentially blocks out light from reaching the outer periphery of the lens, and reduces the Gaussian distortion of the inexpensive bi-convex lens 13. Thus, the provision of the diaphragm 15 both increases the field of view and reduces distortion at the lens edge. Of course the amount of light received by the CCD is reduced by blocking some of it with the diaphragm 15, therefore the amount of light about the finger resting on the prism must be sufficient for adequate detection by the CCD. The location of the diaphragm or aperture is important and is related to the size of the aperture. A large aperture, allowing light to reach the entire preferred useable portion of the lens, is, optionally, located on the lens or two (2) focal distances away. Smaller apertures would need to be placed closer to the focal point based on linear ratio. Thus, an aperture half the size of the large aperture would ideally be located between 0.5 focal lengths and 1.5 focal lengths from the lens. Locating such an aperture outside these distances results in some loss of information. The simplest form of acceptable aperture is an opaque surface or coating applied directly to the outer portion of the lens 13 as is shown in FIGS. 6 and 7.

Figure 6:
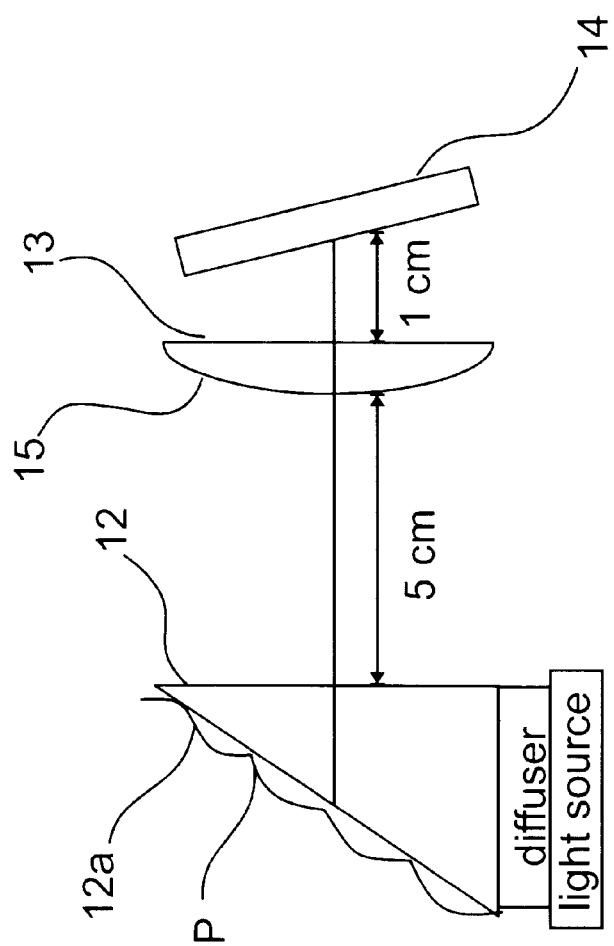
FIG. 6 is a side elevation of a lens having an opaque coating about its periphery depicting a preferred embodiment of this invention.
Figure 7:
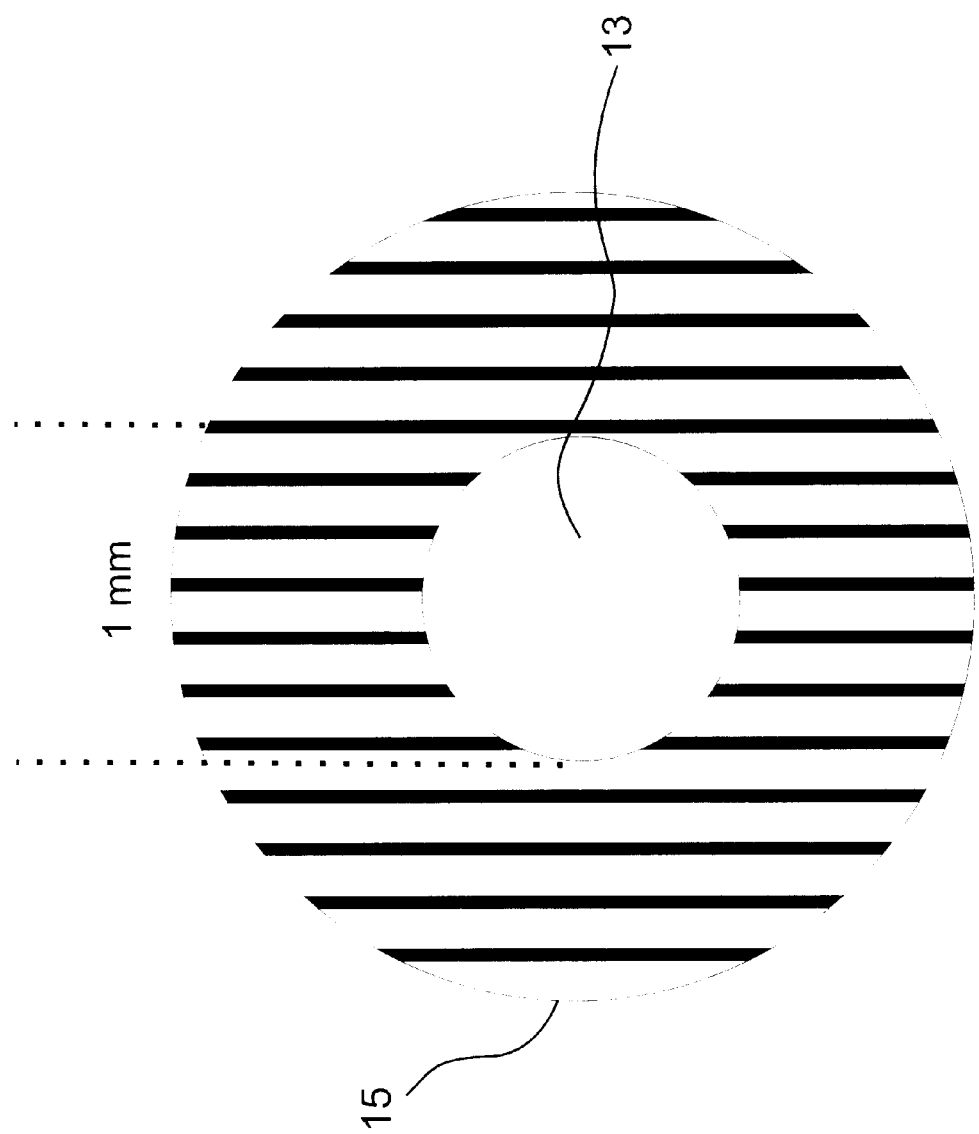
FIG. 7 is a front view of the lens having a coating in the form of a fixed diaphragm applied to are area of the face of the lens as is shown in FIG. 6 in accordance with the invention.

Referring now to FIGS. 6 and 7, a very short and compact device is shown in accordance with a preferred embodiment of the invention. Conveniently, the device is compact enough to be packaged into a hand held instrument about the size of a computer mouse, for attachment to a personal computer, wherein many commercially available devices are several times larger. A lens 13 is disposed between a prism 12 and CCD 14. A diaphragm 15 in the form of a coating, decal, or paint is applied to the periphery of the lens 13, thus obviating the requirement shown in previous embodiments of this invention, for precisely positioning a diaphragm between the lens and the prism. Furthermore, by applying the diaphragm directly to the lens, there is no longer a requirement for affixing and holding in place a discrete diaphragm component. Only the lens 13 need be held in place between the CCD 14 and the prism 12.

The system geometry shown in FIG. 6 has proven to work successfully, producing substantially clear images at the CCD 14. A plano-convex lens 13 is used having a focal length of approximately 6 mm. The CCD array 14 has a pixel element size of approximately 10×10 $\mu$m. The iris diameter of the diaphragm was selected to be 1 mm. The distance from the lens face to the prism back face is approximately 5 cm. The distance from the lens to the CCD face is approximately 1 cm. Preferably, the CCD 14 is tilted as shown at an angle of 5° with respect to the lens back face.

A biometric input device incorporated into a pointing device such as a computer mouse according to the present invention is designed to be used with a computer in the form of a personal computer. The input device is for interfacing with one of several industry standard or proprietary computer peripheral interfaces.

Figure 8:
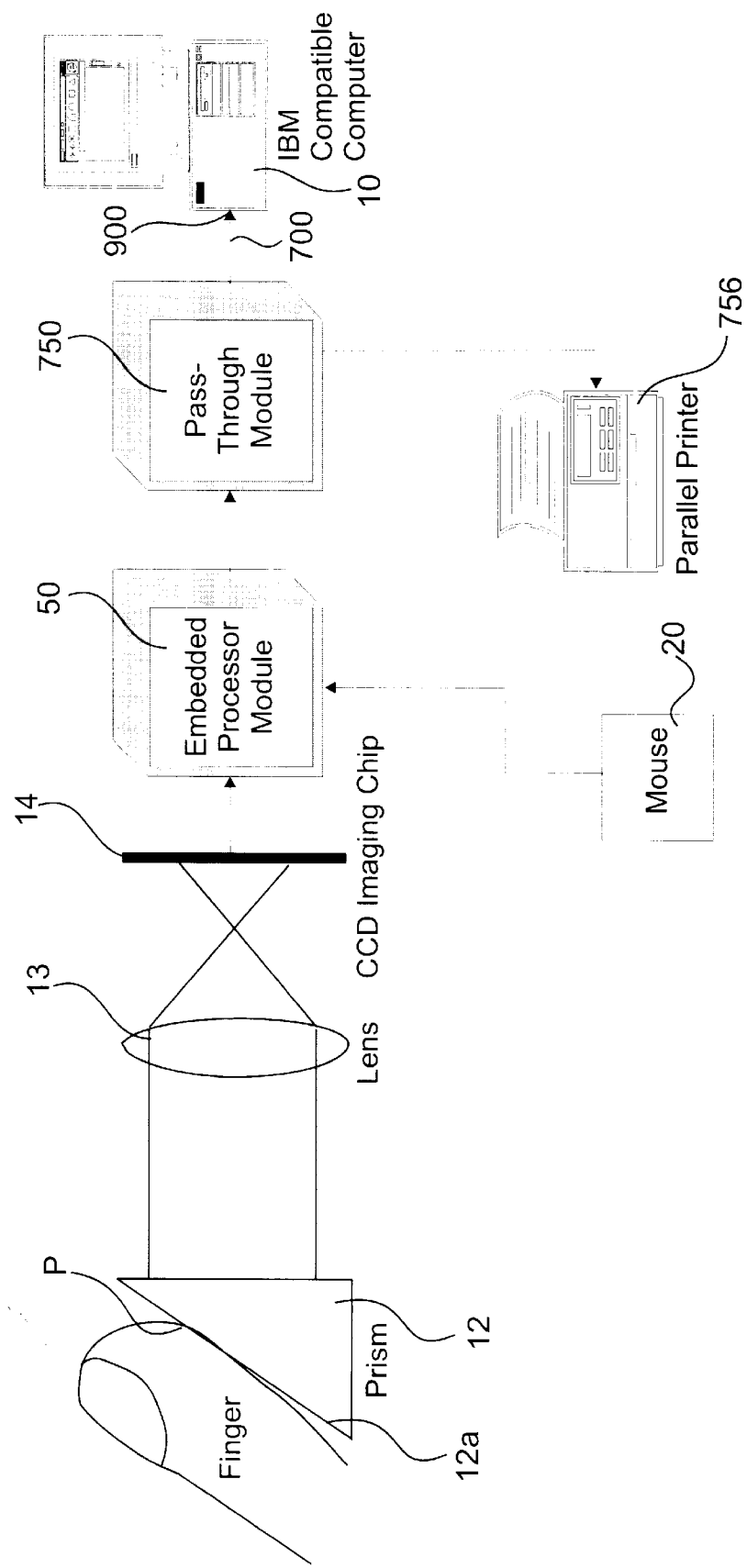
FIG. 8 is a simplified block diagram of a system according to the invention.

Referring to FIG. 8, a simplified block diagram of a biometric imaging device with a parallel pass through is shown. The imaging means comprises a prism 12 having a surface 12a for contacting a fingertip, a lens 13, and a CCD array 14 for imaging incident light. A processor 50 converts an analog signal provided by the CCD 14 to a digital signal. A pointing device in the form of a mouse 20 housed within a same housing as the optical imaging means provides a signal in dependence upon relative position of the mouse to the processor module 50. Pointing devices are well known in the art. The processor module 50 provides a signal in dependence upon the relative position information and the digital signal to a pass through module 750. The signal is a combination of the digital signal and the position information formed by multiplexing the information into a third signal. Alternatively, the third signal is formed by encoding the digital signal with position information in a predetermined fashion. The pass through module 750 is connected to a peripheral port 900 on a computer 10 via a communication means in the form of a cable 700 and allows further digital devices to be connected via the pass through module 750 to the same port. A printer 756 is shown connected to the computer via the pass through port 750. The use of a single port for multiple devices is desirable as it increases flexibility and expandability of computer systems. Alternatively, a pass through port is not used and the apparatus according to the invention occupies a single port on the computer 10.

Figure 9:
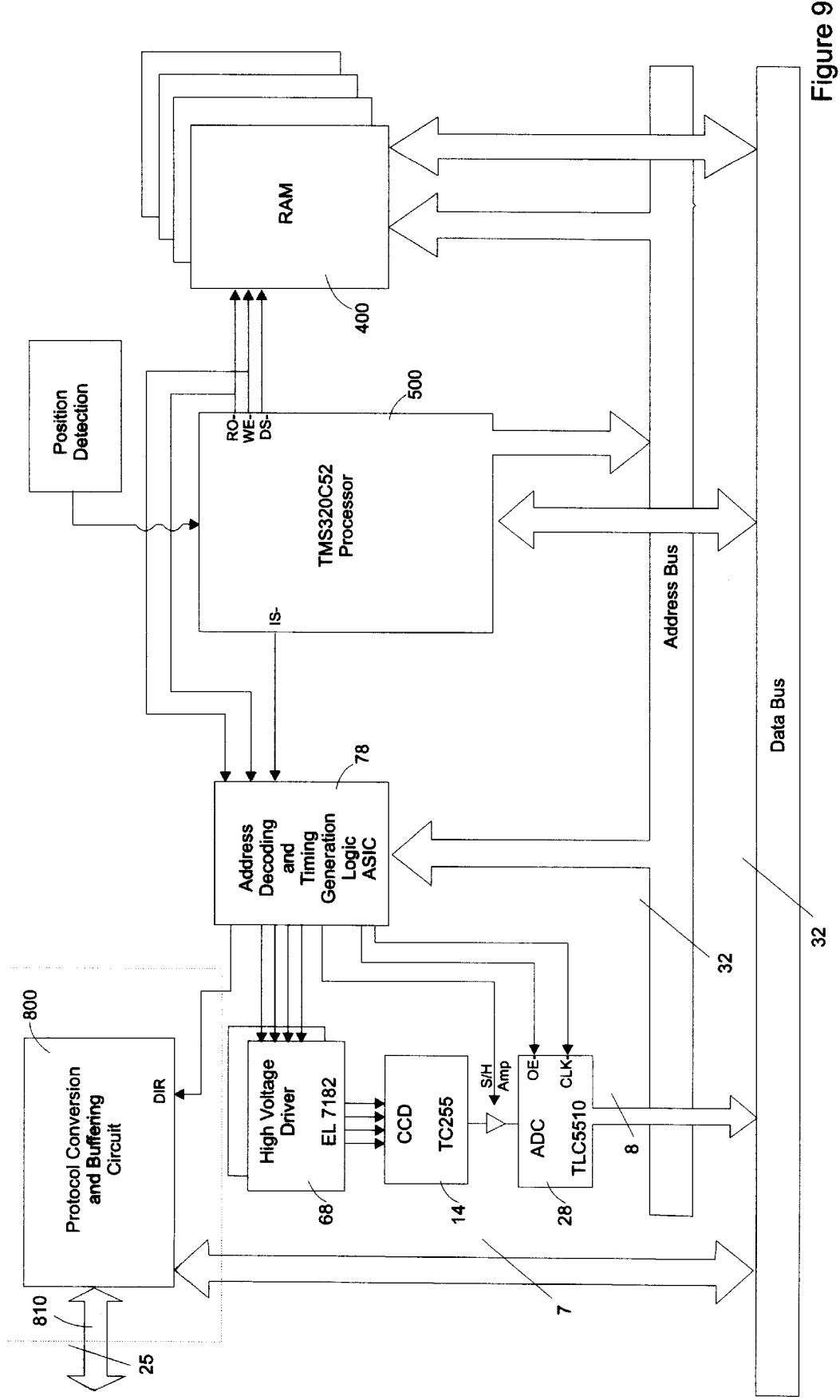
FIG. 9 is a simplified schematic diagram of a system according to the invention.

Referring to FIG. 9, a detailed block diagram of an embodiment of the invention is shown. A CCD 14 is used to capture an optical image in the form of a fingerprint image. The CCD 14 is driven by a high voltage driver circuit 68. Address and decoding circuitry 78 provides control signals to the high voltage driver and acts to gate image information output from the CCD 14 through an analog to digital converter 28 and onto a data bus. The address decoding circuit 78 is driven by a processor 500 in the form of a micro-controller and is connected to an address bus. The micro-controller operations are performed in accordance with a predetermined instruction set stored in RAM 400. Alternatively the instruction set is stored in ROM (not shown). A buffering and protocol conversion circuit 800 allows information from the data bus to be output directly to a parallel or serial digital input port present in a computer. One such input port is a parallel port. Different buffering and protocol conversion circuits are used with different digital ports.

Alternatively, the buffering and protocol conversion circuit 800 is a pass through serial port circuit. Such a circuit allows the connection of a plurality of devices to a single computer peripheral port. The circuit operates to allow other peripherals connected to the port to operate normally while the image capture device is not in use. During use, however, the image capture device assumes control of the port and prevents normal operation of other peripheral devices. For use with a pointing device, serial devices experience a reduction in performance for long data transfers because pointing device sampling is a high priority operation.

Figure 10:
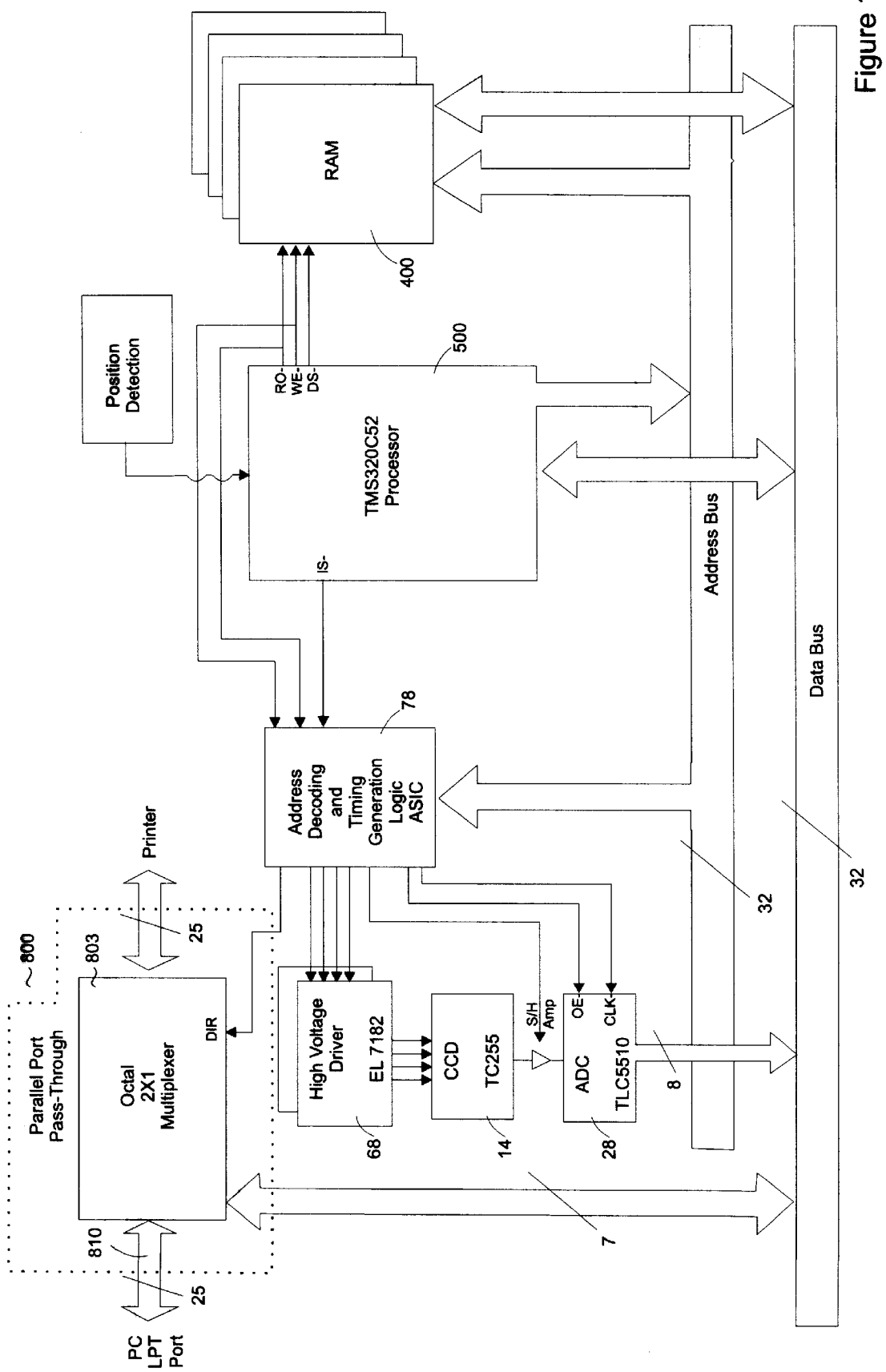
FIG. 10 is a simplified schematic diagram of a system according to the invention incorporating a parallel pass through port.

Referring to FIG. 10, the buffering and protocol conversion circuit 800 comprises a parallel pass through circuit. The circuit comprises 2×1 multiplexers 803 for allowing processor controlled switching of a peripheral port data bus 810 to other peripheral devices (and therefrom) or to a biometric imaging device according to the present invention. The addition of a buffer (implemented using processor control logic and the RAM) allows for the biometric imaging device to buffer signals from other devices while transferring information in the form of relational position information and imaging information to the peripheral port data bus. Alternatively, the pass through buffers imaging information. Further, by monitoring control signals from the peripheral port in an unswitched fashion, the device is capable of receiving control information while other peripherals are in use. This form of monitoring requires multiplexers for a peripheral port data bus 810 carrying information to the peripheral port from peripheral devices and does not require multiplexers for a peripheral data bus carrying information to the peripheral devices from peripheral port. Optionally, buffers are used for information to the peripheral devices from peripheral port in order to increase distance and quantity of peripheral devices connected to a single peripheral port.

In an embodiment, the relative position information is encoded into individual image frames in the form of intermittent information, header information, or in place of predetermined pixels at, for example, the periphery of the image. In order to accomplish this, the mouse position sensors are sampled by the microcontroller 500 at intervals. The position sensors' values at each interval is encoded into image data. This is accomplished, for example, by inserting the position information at the beginning of each row of pixel values.

Further, the use of microcontroller 500 allows for changing of the predetermined port to one with a different connector or configuration with only minor modifications such as changing the programming stored in non-volatile memory. Also, the encoding of the position information is alterable with similar modifications. Alternatively, the means comprises dedicated circuitry for transmitting the image in a digital form.

The carrier means 700 is in the form of a cable, radio transmission, or infrared transmission. Such carriers are known in the art. When a non-physical carrier such as radio or infrared emissions is used, a suitable receiver is required connected to or integrated with the computer. Such a configuration enhances portability by requiring no physical connection to the imaging device; however, where the suitable receiver is not a common feature of installed computers, a receiver would then be necessary for every computer with which the imaging device may be used.

The connection means 900 is selected to mate with a connector on a computer with which the imaging device is to be used. It is anticipated that such a connector mates with industry standard ports for parallel or serial communications. Some examples of ports include Geoport®, Apple Desktop Bus®, parallel port, RS232 port, IRDA, game port and universal serial bus port. Portability is enhanced when the port is accessible when the computer is installed and in use.

Alternatively, the micro-controller circuitry is designed so the programming is provided after power up via a predetermined port on a computer 10. Programming in this fashion is performed by a host computer executing software designed to program the micro-controller 50 via the predetermined port on the computer 10. The design of micro-controller circuits that are programmed from remote processors or host computers is known; however, unlike the present invention, such designs often limit the use of the micro-controller circuit to a specific predetermined interface such as a standard PC parallel port or an RS232 port.

In use, the mouse comprising a biometric input device is coupled to a computer. The computer is turned on and the device is powered from the computer's power source. Alternatively, the device may be provided with a separate power source. The micro-controller within the device is programmed and begins sampling the mouse position sensors and analyzing digital images provided by the analog to digital conversion circuitry means for an image in the form of a finger print. While no image is detected, the mouse position information is provided to the computer at intervals. When a desirable image is detected, an interrupt is generated on the computer to allow for a data transfer to take place. When image data transfer occupies a very short duration, sampling of the mouse position sensors during data transfer is unnecessary. When the image data transfer is lengthy, the mouse position sensors are sampled at intervals and the information retrieved is encoded into the image data by replacing unused pixels, adding extra data at intervals, or another data encoding scheme. Alternatively, an indication other than an interrupt is used to commence image data transfer.

Software executing within the computer may use the digital image as a data input signal for user authorization, or for another purpose. Preferably, when used for user or task authorization such as root level access to a computer network, such a device is designed for portability and is easy to install and remove from the computer.

Typically, CCDs for use with this device require 0.25 seconds to transfer an analog electronic image to the analog to digital conversion circuitry means. The first 0.25 seconds wherein a finger print is detected by the micro-controller (as well as the last 0.25 seconds) may result in a poor quality digital image where the finger tip was moving and was only present on the device for a small portion of the 0.25 seconds. Further, finger tip positioning changes during contact which results in different digital images of a single finger tip. To overcome this problem, a time series averaging technique is applied to each of the digital images provided to the micro-controller in order to build a composite image of the fingerprint that will be better quality than any one print image on its own. Time series averaging is known in the art of digital image processing. Alternatively, the micro-controller can select a digital image based on a predetermined selection criteria.

Figure 11:
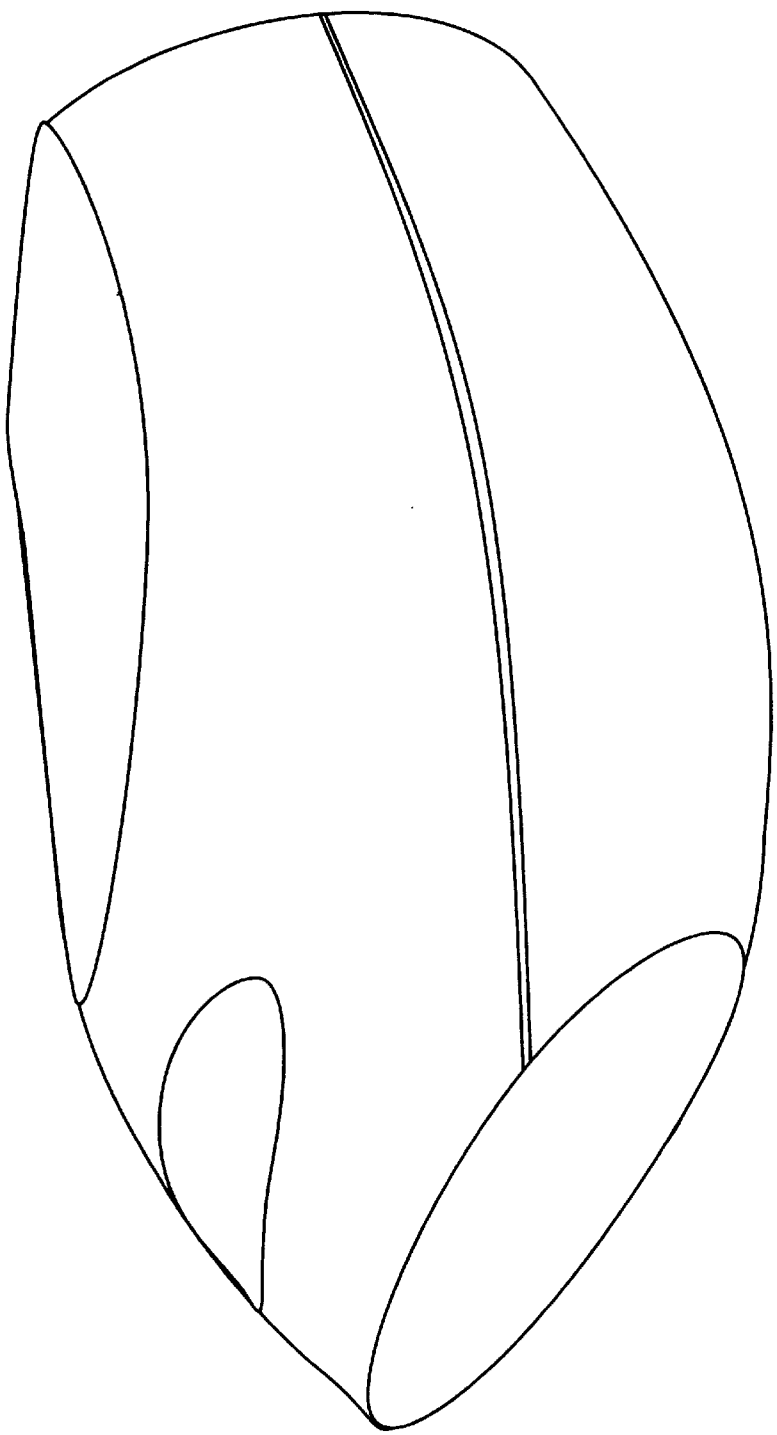
FIG. 11 is a computer rendered drawing of a hand held fingerprint scanner for connection to a personal computer.
Figure 12:
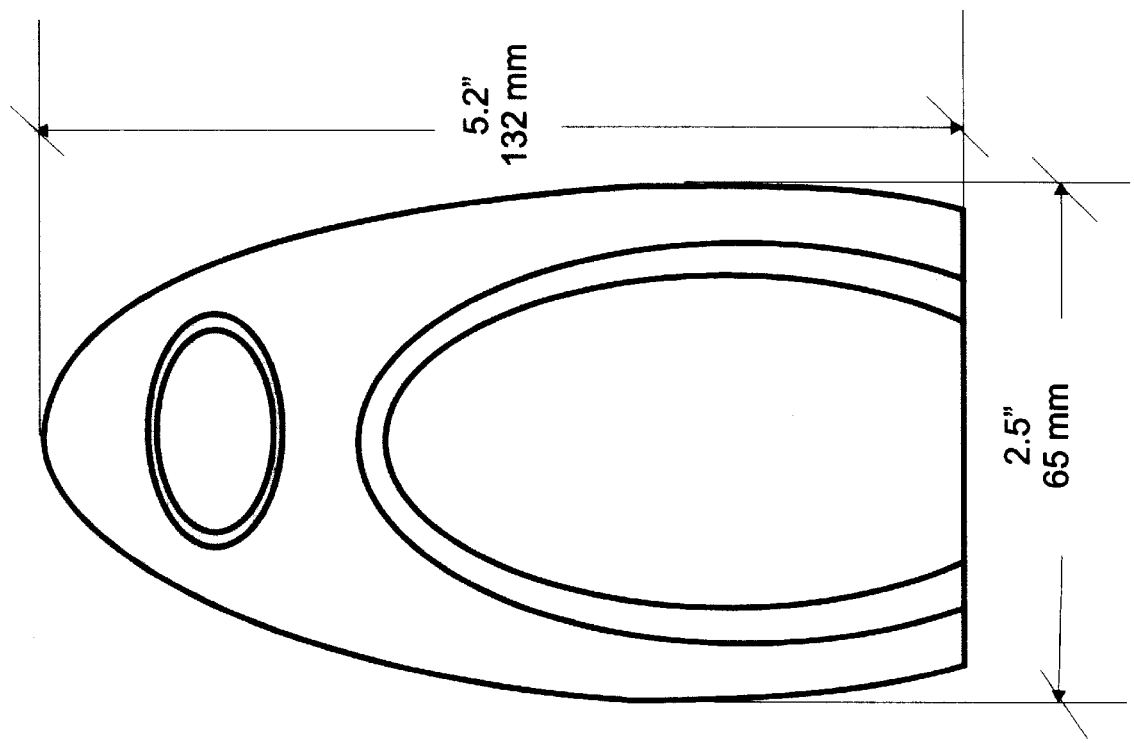
FIG. 12 is a top view of the computer rendered drawing shown in FIG. 12.
Figure 13:
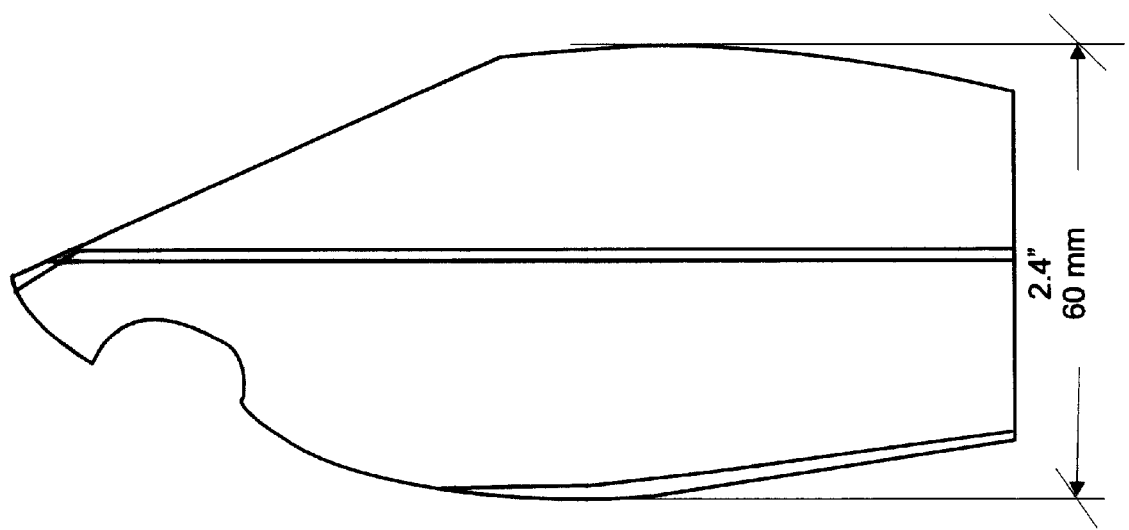
FIG. 13 is a side view of the computer rendered drawing shown in FIG. 12.

FIGS. 11, 12, and 13 show the ergonomically designed hand held device that contains the circuitry shown in the previous figures. By reducing the length of the optical path in the manner shown, this small hand held device is realisable and may be manufactured at a relatively low cost, using an inexpensive lens.

Although white light may be used, it is preferable to employ a monochromatic light source. Red light of a wavelength in the range of 700–800 nm is most preferred, since this wavelength range is at the highest response region of the conventional electronic imaging devices used. Illumination in the range of 0.5 to 2.5 lux has been found to be effective.

Figure 14:
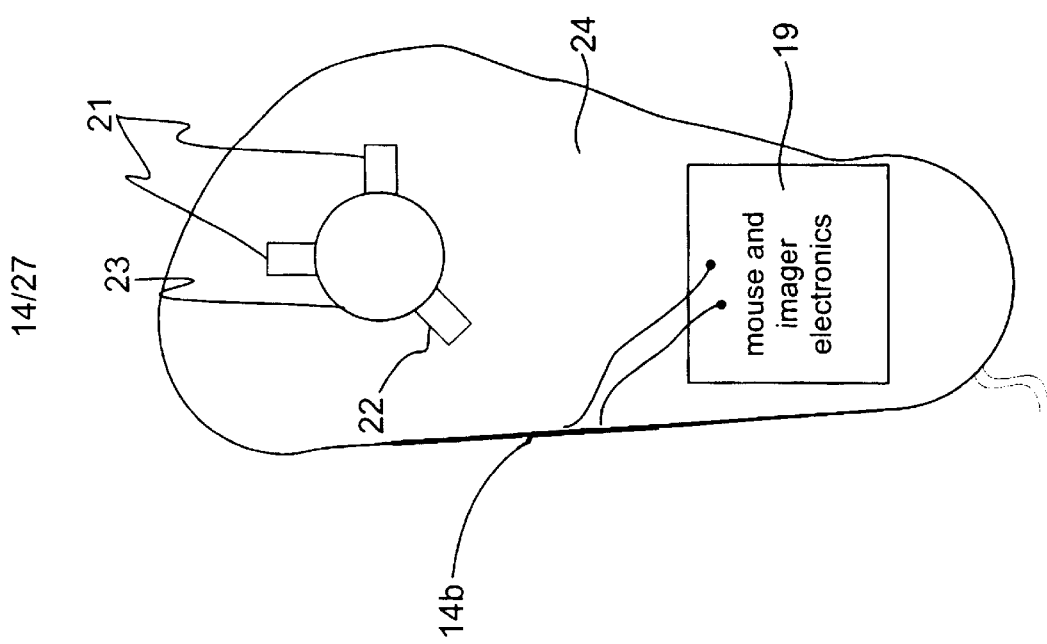
FIG. 14 is a simplified schematic diagram of a mouse having a solid state fingerprint imaging means incorporated therein.

Referring to FIG. 14, a mouse comprising a position sensing means and a capacitive contact imaging means is shown. The mouse housing 24 houses both means. The mouse comprises a position detecting device in the form of two position sensors 21, an idler wheel 22, and a ball 23 for engaging a surface on which the mouse is placed and for rotating in relation to mouse movement along the surface. Construction and design of pointing devices is well known within the art.

Within the housing 24 is an apparatus for imaging fingerprints. The apparatus comprises a capacitive sensing array 14b onto which a subject fingerprint "TIP" is laid. Addressing circuitry samples each array element within an array on the capacitive plate to determine a voltage or current value. The values are then digitised and provided to a circuit 19. The apparatus further includes a circuit 19 for providing a signal in dependence upon both the mouse position detecting circuit output signal and the capacitive sensing array 14b output signal. The systems incorporated within the mouse are similar to those described above.

Figure 15:
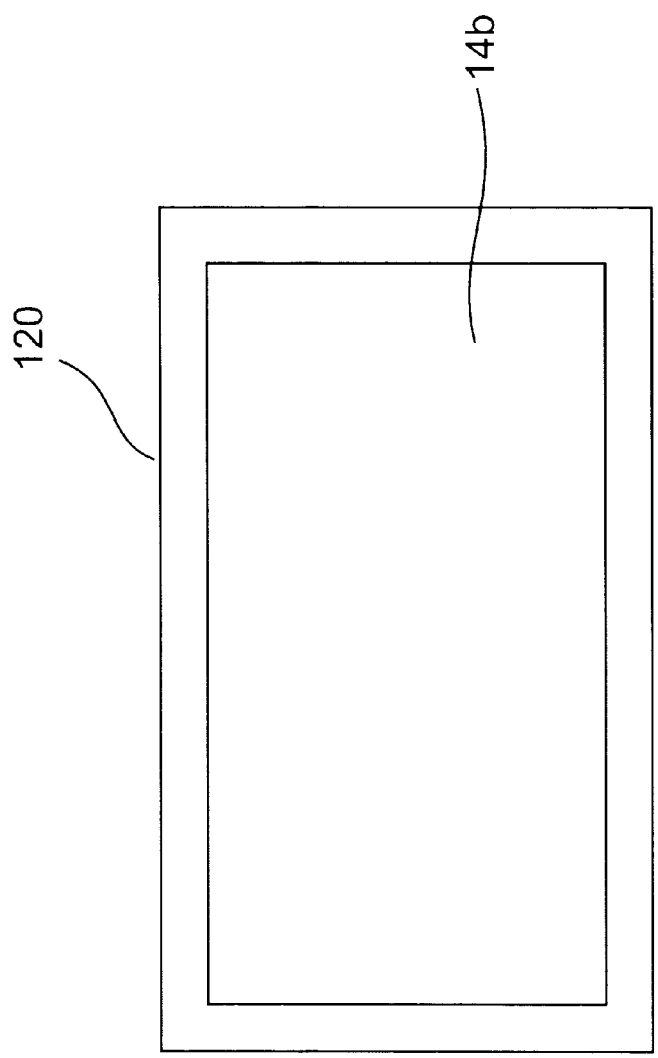
FIG. 15 is a diagram of a track pad according to the invention.

Referring to FIG. 15, a trackpad is shown incorporating a contact imaging device. The trackpad is formed of a capacitive contact imaging device. The location of a fingertip on the surface of the trackpad is provided to a computer encoded within image frames according to the invention. The image of the fingertip resting on the trackpad is provided to the computer when available. With frame transfer rates supported by existing COM and LPT ports on PC compatible computers, data transfer rates require approximately 0.2 to 0.5 seconds to transfer a fingerprint image via such a port. Pointing devices in the form of trackpads provide rapid response to user actions and, therefore, are not well suited to providing information as infrequently as one or two times per second.

Figure 16:
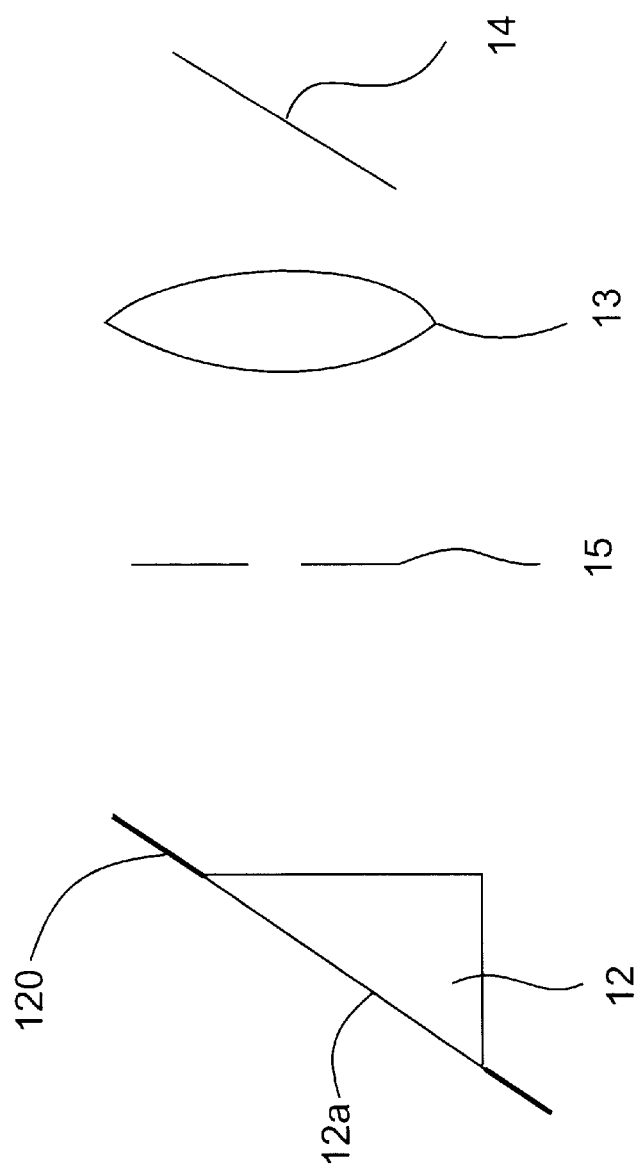
FIG. 16 is a simplified block diagram of the track pad embodiment of the invention.

Alternatively, as shown in FIG. 16, the trackpad 120 comprises an optical contact imaging device according to the invention. Again, bandwidth limitations of computer peripheral ports require provision of location or position information at intervals during image transfer. Several methods are envisaged for accomplishing this. These methods provide trackpad position information and image information to a same peripheral port of a computer. This "multiplexing" of data is now described with reference to FIGS. 17 and 18.

Figure 17:
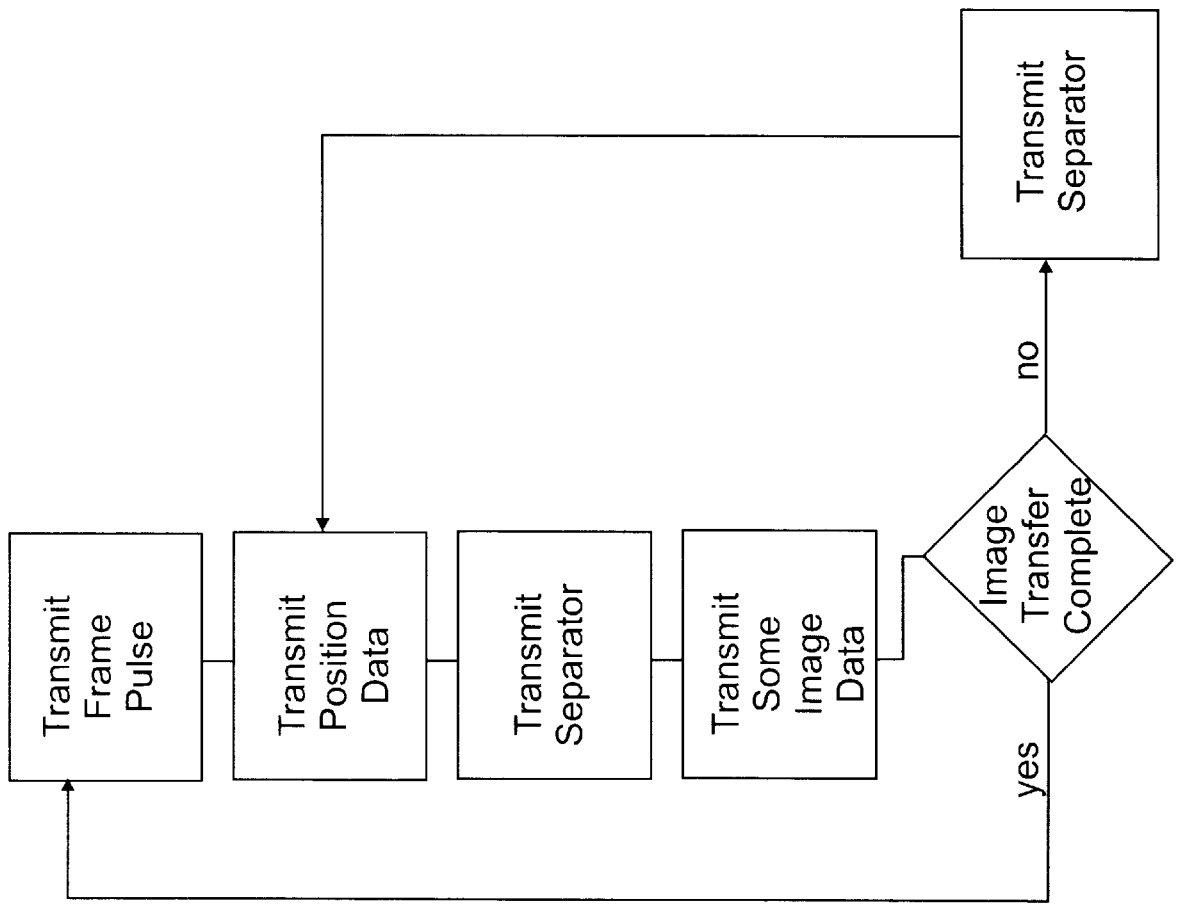
FIG. 17 is a simplified flow diagram of a method of encoding position information within image frames according to the invention.

Referring to FIG. 17, a simplified flow diagram of a method of encoding information is shown. A standard multiplexing technique is used to transmit position data and image data simultaneously. A frame pulse, indicates the beginning of a frame. Frame pulses and digital sequences used for frame pulses are known in the art of communications. Immediately following the frame pulse, position data is provided to the computer. Following the position data, a separator is provided to the computer, alternatively, no separator is used when synchronisation between the computer and the pointing device is established. A predetermined amount of image data is then provided to the computer. The amount of image data is determined in dependence upon a reasonable interval for sampling position data. Alternatively, the amount of image data is determined in dependence upon a horizontal or vertical scan line in the image. When the image data is transferred a determination of frame location is made. When the frame is completed, a new frame pulse is transmitted and the method repeats. Alternatively, when the frame is not complete, a separator is transmitted to the computer followed by position data.

Figure 18:
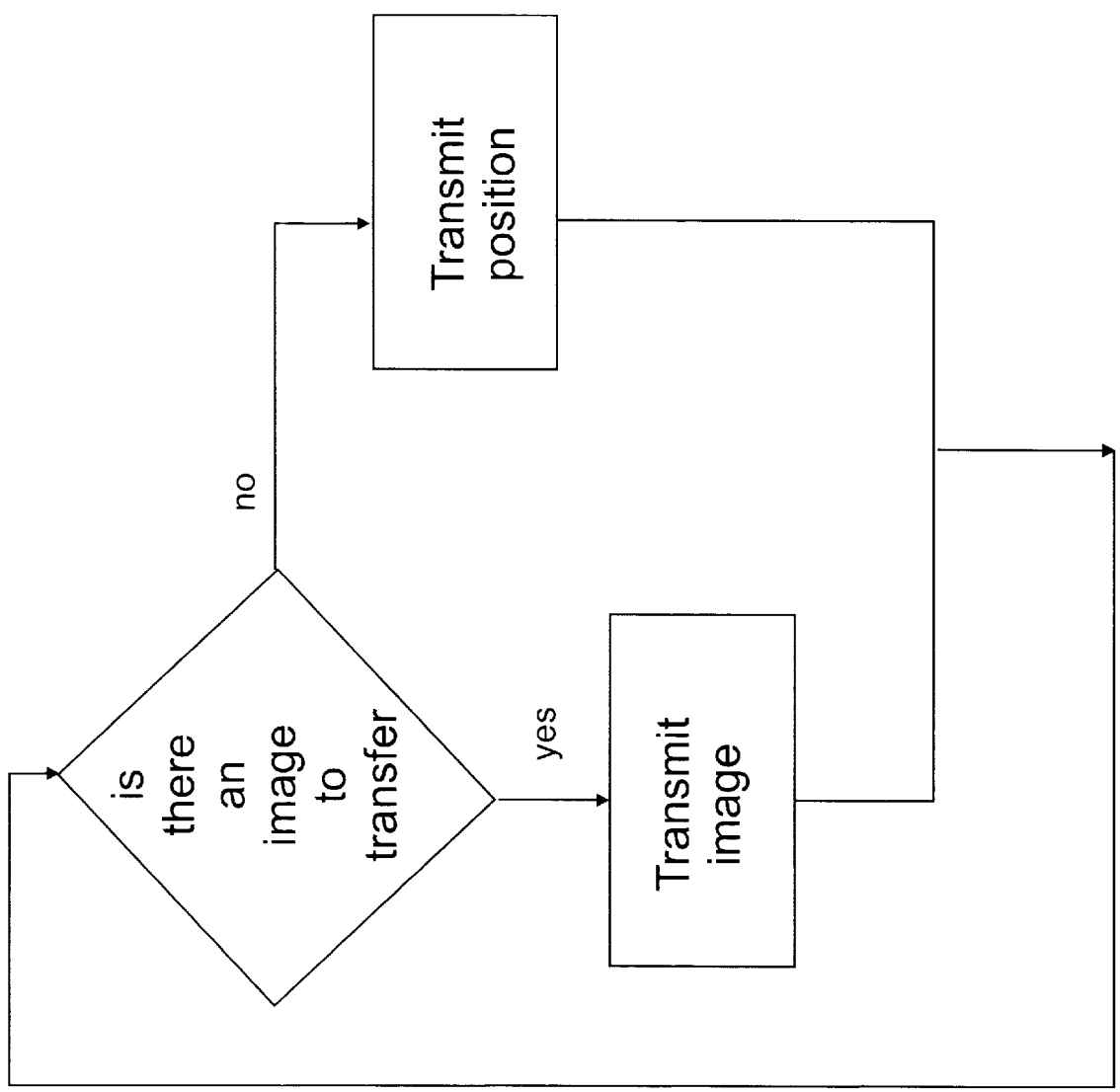
FIG. 18 is a simplified flow diagram of a method of providing information to a computer, the method comprising two distinct modes of operation according to the invention.

Referring to FIG. 18, a simplified flow diagram of a further method of encoding information employing two modes is shown. When an image is present, a similar method to that described above is followed. Alternatively, when an image is present only image data is transferred and no position data is multiplexed therein. When no image data is present or requested, only position information is transferred. A header for each image indicates the presence of image data or position data during a single frame.

In yet another embodiment suitable for use in a trackpad embodiment, a resolution of the imaging device is reduced for pointing device operation. A frame pulse or header indicative of pointing device operation mode is transmitted with a low resolution image. The image is analysed by the computer to determine position information for an object on the contact imaging device. When an image is requested, a high resolution image is transferred to the computer and position information is not transferred until the image is completely transferred.

In yet another embodiment of the invention, images are stored in buffers within the pointing device and are transmitting continuously during periods between position data transfer in order to occupy periods of non use of the computer peripheral port.

In yet another embodiment suitable for incorporation into a trackpad, a small array within an image is transmitted at high resolution when a fingerprint is provided thereto. A value indicative of the location of the array is also transmitted to the computer for use as position data. Such an embodiment is particularly applicable to large surface area trackpads wherein finger tip location on the trackpad determines position and imaging of the finger tip is also performed.

Figure 19:
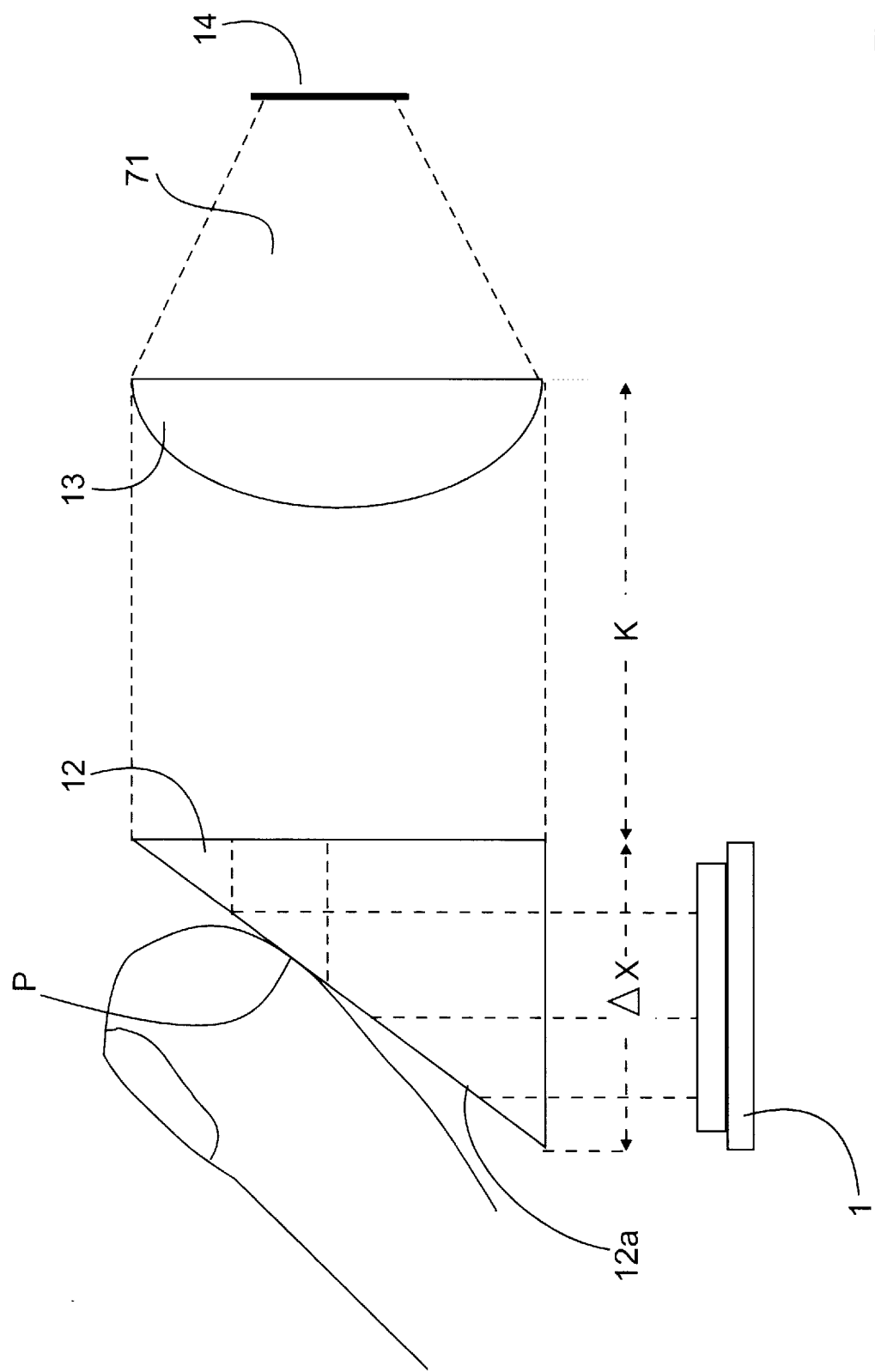
FIG. 19 is a side view of an optical apparatus for identifying fingerprints.
Figure 20:
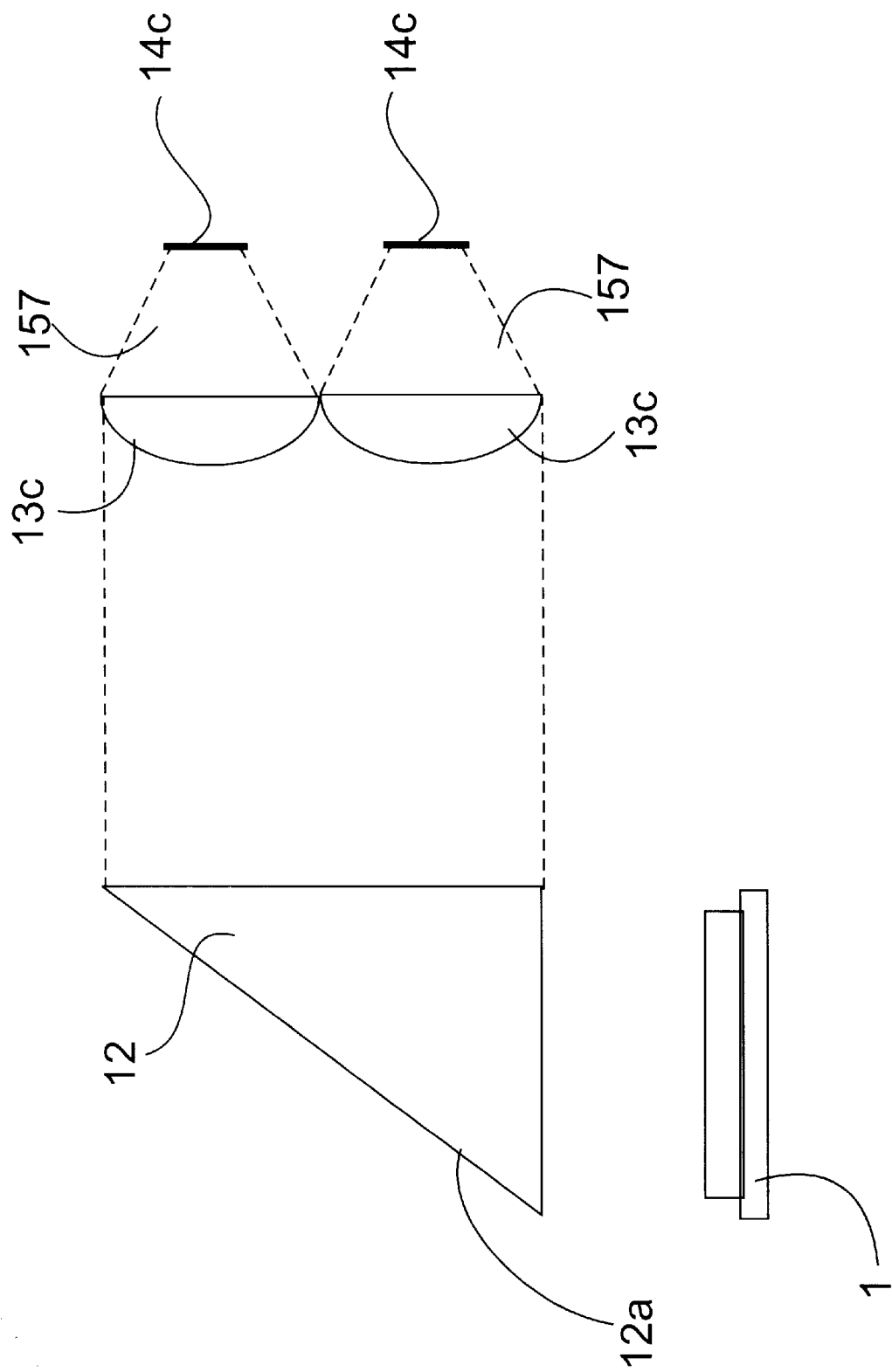
FIG. 20 is a schematic view of one embodiment of the device of the invention.

Referring to FIGS. 19 and 20, an embodiment of an optical contact imager for use in the present invention is shown. The embodiment shown reduces contact imager size considerably by using a plurality of CCDs to image a fingerprint.

As illustrated in FIGS. 19 and 20, the height of an optical fingerprint imager is a function of a trapezoid formed by the CCD at one base thereof and the lens at the other base thereof, assuming lenses of comparable focal power. As can be seen in FIG. 19 in comparison with FIG. 20, the large base (the diameter of the lens 13) gives rise to a large trapezoid 71 compared to the two trapezoids 157 defined by the lenses 13c and the corresponding CCD arrays 14c.

In the optical system of FIG. 20, only two lenses 13c are shown. Actually, in order to better cover the beam reflected from the object and passing through the viewing surface of the prism 12, the system has four lenses, each defining a separate optical path. These four separate optical paths are formed by the use of four lenses and four corresponding CCDs 14c. All the lenses have a focusing length such as to focus their part of the image (a subimage) in a focal plane in which the corresponding CCD element is disposed. In FIG. 20, the focal plane is common for all the lenses 13c; as will be discussed hereinbelow, this is not always necessary.

The CCDs 14c may be smaller than the CCD 14 of FIG. 19 and still maintain the resolution of the CCD 14, or they may be of equivalent size to the size of the single CCD 14 and thus increase resolution substantially. In either case, the total size of the optical imaging device of FIG. 20 is reduced compared to that of FIG. 19 for the resolution obtained.

The number of lenses is not limited to four. According to the invention, any practical plurality of lenses disposed such as to focus a part of the reflected light carrying the image of the object may be employed.

Figure 21:
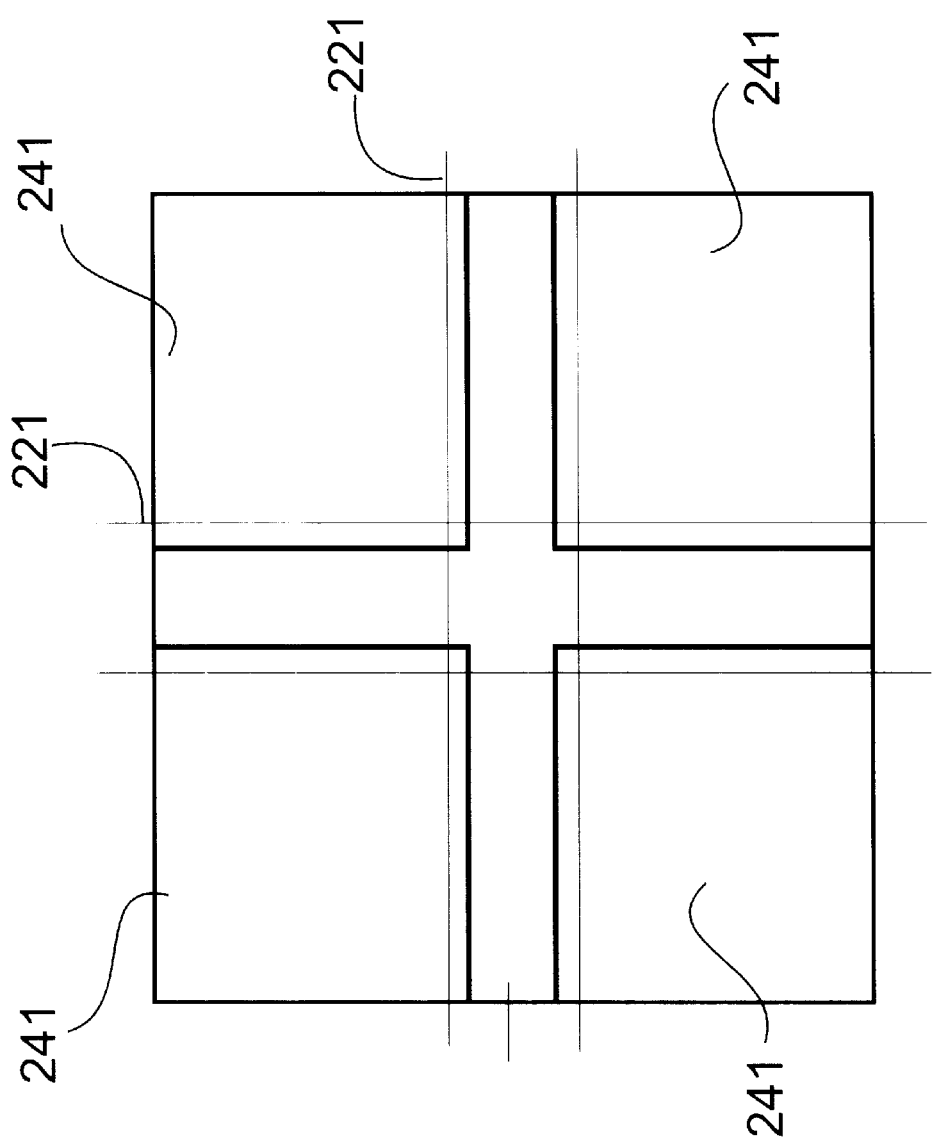
FIG. 21 is a plan view of a multiple image sensor of the invention.

It is known in the art that the pattern of electrical charges created on CCD chips can be transmitted sequentially out of the chip to be reassembled by an analyzing circuit e.g. on a readout screen. According to the present invention wherein a plurality of chips is employed, it is advantageous to provide alignment marks on separate subimages to assist in a precise reassembly of the separate subimages into a true picture e.g. a fingerprint image. Such alignment marks, as illustrated in FIG. 21, may take the form of crosshairs or other indicia. To create such alignment marks 221 on an image sensor, a reticle is provided on at least one of the lenses. The sub-beam carrying a subimage is then also transmitting the reticle (e.g. crosshairs) into the corresponding image sensors (area CCDs 241). Knowing the predetermined positioning of the reticle (crosshairs) on the lens or lenses, it is easy for those skilled in the art to reassemble the image on the display screen. The fact that the image will carry the corresponding alignment reticle or indicia is either very important or secondary, depending on the application. For the purpose of simply determining a presence or absence of a pattern such as a fingerprint, the presence of alignment lines may well be negligible or of minor importance. It would of course disqualify a video film or the like.

FIG. 21 shows the four chips 241 assembled in a common plane to receive the subimages from the four lenses 13c of FIG. 20, the focal length of all the four lenses being identical. As will be demonstrated hereinbelow, this is not a prerequisite. However, FIG. 21 is an example of a better use of the wafer. It is, arguably, more economical to cut four small chips (shown on the right side of FIG. 21a) and to attach them to a common backing for the purpose of the embodiment of FIG. 20 (elements 14c) than to manufacture a single large chip equivalent to the size of four chips 241.

FIG. 22 illustrates how two subimages can be reassembled by aligning their common features in the form of crosshairs lines.

It will be noted that the subimages can be assembled in an abutting manner or with an overlap. As remarked above, any small deterioration of the image quality may be secondary for the purpose of identifying the presence or absence of a pattern (e.g. a fingerprint), a predetermined design or mark.

As discussed in conjunction with FIGS. 19 and 20, it will be appreciated that the provision of four lenses 13c instead of one lens 13, may shorten the optical path between a lens and the corresponding CCD chip by 50%, subject to the comparability of the optics. By the same token, the single lens 13 of FIG. 19 may be replaced by another number of lenses, e.g. nine, in a side-by-side or an overlapping pattern, to cover the beam of light reflected from the object under investigation. It will be evident to those skilled in the art that an arrangement with nine lenses would result in the shortening of the optical path between a lens and the corresponding image sensor by 66.7%. Such shortened optical paths will in turn result in a reduction of the overall dimensions of the device.

Figure 23:
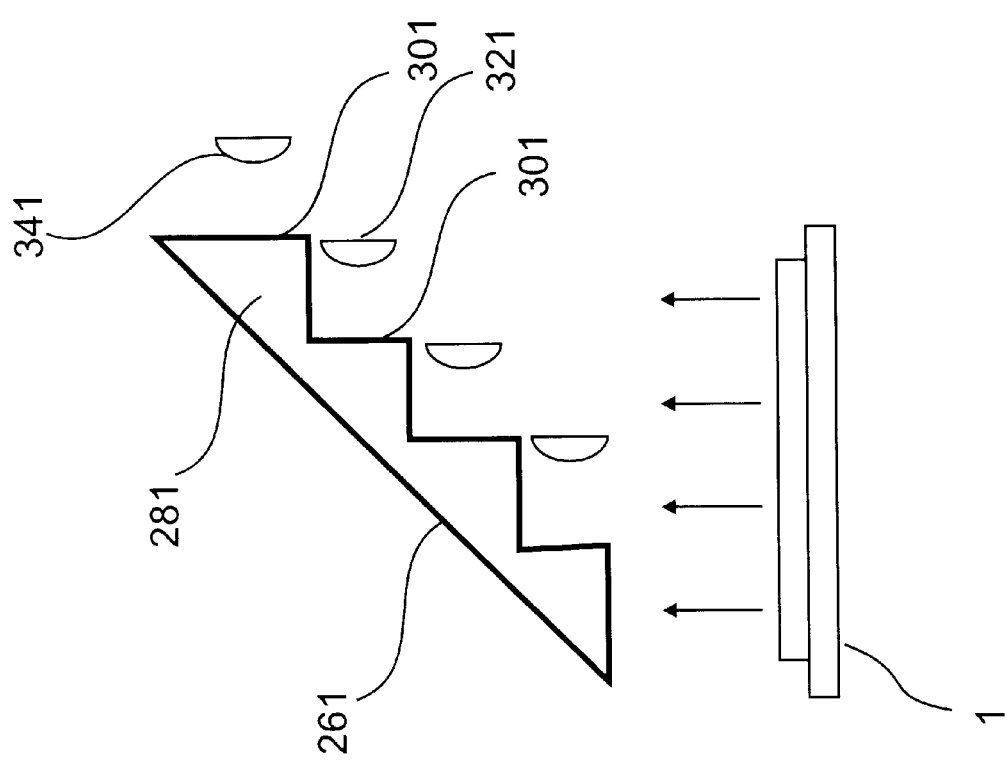
FIG. 23 is a schematic view of an embodiment of the device of the invention using a multi-prism.
Figure 24:
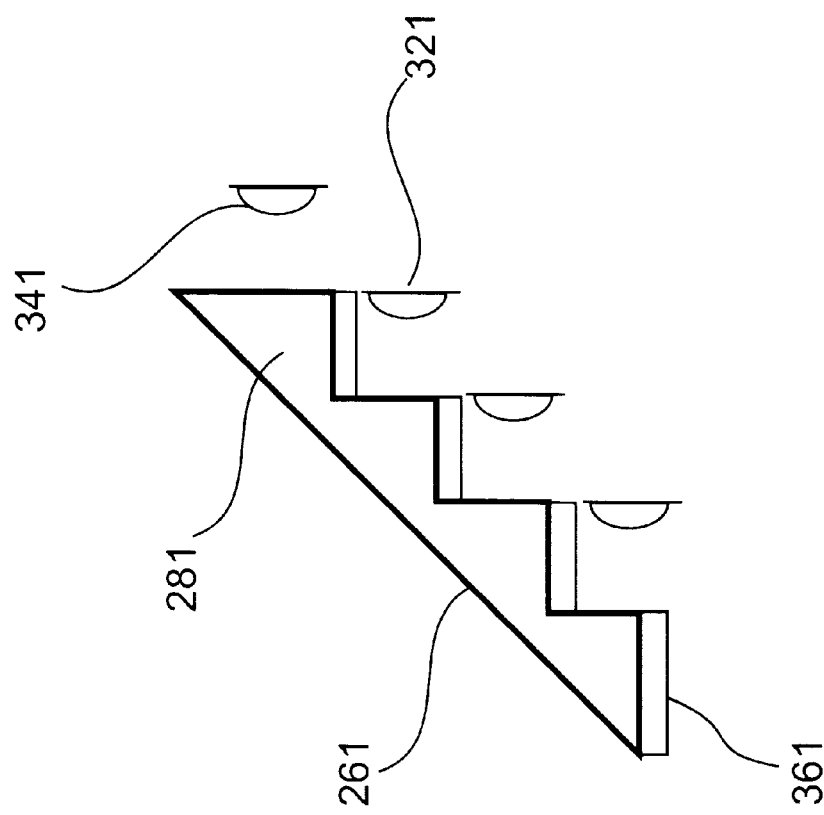
FIG. 24 is a schematic view of another embodiment using a multi-prism.
Figure 25:
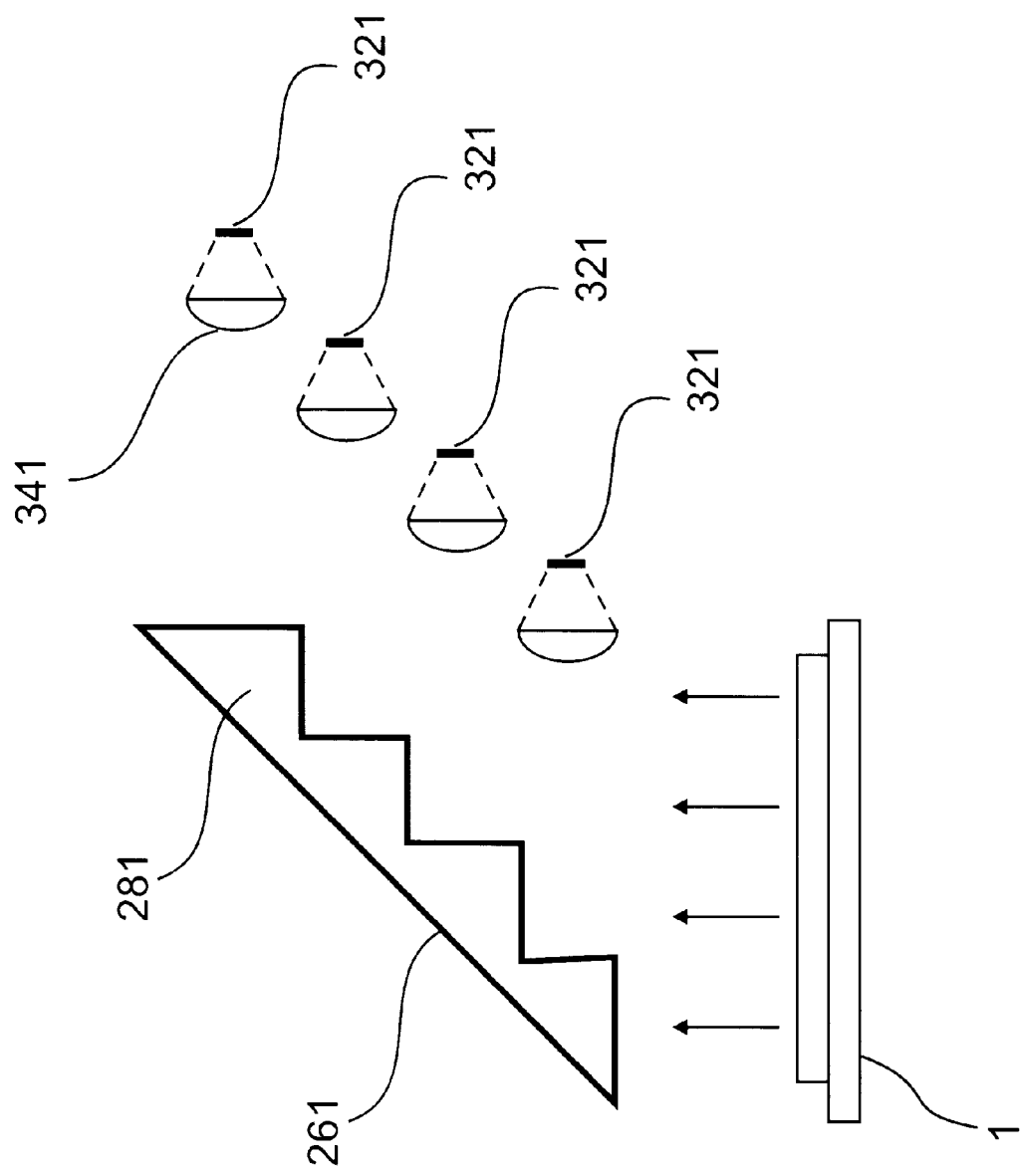
FIG. 25 is a schematic view of still another embodiment using a multi-prism; and, FIG. 26 is a schematic view of still another embodiment of the invention.

In exemplary embodiments of the invention, a conventional prism is replaced by a multi-prism 261 shown in FIGS. 23, 24 and 25. The staircase-shaped prism, shown in a side view, may be designed in a single piece or as a plurality of small prisms 281 secured to a common backing. As seen in FIG. 23, each small prism 281 is illuminated with a portion of the light emitted by the source 1, and the light is reflected from an object, e.g. a fingerprint pattern, shown in FIG. 19, applied to the slanted face of the prism 261. The reflected light passes through the viewing faces 301 onto image sensors 321, each having a lens 341 applied directly thereto to simplify the design and to minimize the size of the device. The analyzing circuit and the display are not illustrated.

A somewhat different embodiment is illustrated in FIG. 24, the difference being in that the single source of light 1 is replaced by separate light sources 361 applied directly to the illuminating ("bottom") surfaces of the small prisms 281.

It will be recognized that the embodiment of FIG. 23 gives rise to some banding. The light beam emitted by the source 1 towards the slanted face of the multi-prism 261 is partially obscured by the CCD/lens sets 321, 341. The resulting shading creates banding on the sub-images provided by the CCDs 321 on the display. This drawback is a trade-off for a significant reduction in size of the design of FIG. 23 as compared with the conventional design of FIG. 19. It will be noted that the design of FIG. 24 does not eliminate the shading completely, but it does contribute to space saving as it eliminates the outside light source in favor of "integrated" sources of light 361.

In the embodiment of FIG. 25, shading by the lenses and CCDs is eliminated at the expense a somewhat larger overall size of the setup. It will be noted that the overall size still offers a reduction in size over the conventional design of FIG. 19 owing to both the staircase prism design and the reduction of the distance between the lenses and the image sensors (CCDs).

In the above-discussed embodiments of FIGS. 20, 23, 24 and 25, the prism is a right-angle prism or is comprised of a plurality of right-angle sub-prisms 281. It is conceivable to employ prisms with sharp or obtuse angles between the illuminating surface and the object viewing face.

It will be apparent to those of skill in the art that capacitive transducers for use in the capacitive contact imaging device described herein, can also be assembled in arrays to reduce manufacturing costs, increase manufacturing yields, and prevent breakage during use. Alternatively, a glass plate is etched with capacitive pads for use in a capacitive contact imager and the integrated circuit for sampling the state of the pads is located within the pointing device below the glass plate.

Figure 26:
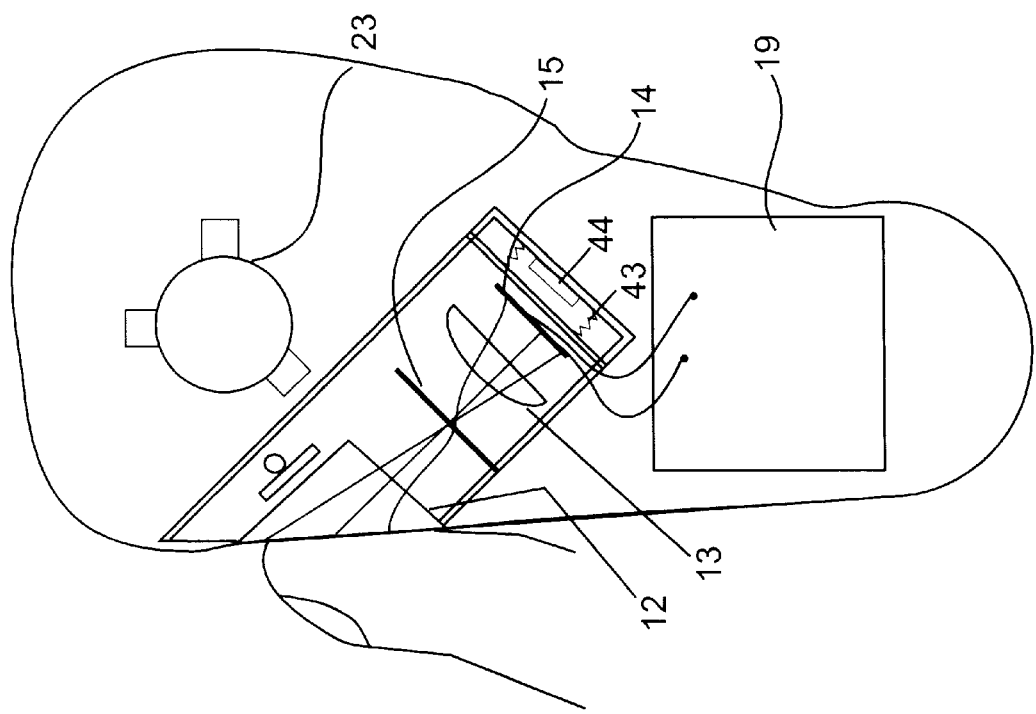

In a further embodiment shown in FIG. 26, the contact imager in the form of an optical contact imager is provided with a switch 44 for enabling or disabling imaging operations. Preferably the contact imager is movably housed within the housing and biased by a biasing means 43 toward the outside of the housing. Pressure from a fingertip in contact with the contact imager, enables the contact imager and, therefore, results in an image being captured and provided to the microcontroller circuit. Absent contact with the imager, no image is captured and the microcontroller receives only position data. In this embodiment, the reduction in information provided to the microcontroller results in provision of image information to the computer when desirable and reduces data transfer to the computer via the computer peripheral port.

In yet another embodiment, the pointing device comprises means for analyzing the image information to determine whether or not a desirable image is present therein. The means for analyzing acts as a switch preventing image information corresponding to undesirable images from being provided to the computer.

Of course, numerous other embodiments may be envisaged without departing from the spirit and scope of the claimed invention.

What is claimed is:

1. An apparatus for providing fingerprint imaging information and positional information for use with a computer, comprising:
    a housing;
    a pointing device housed within the housing and for providing a first signal in dependence upon location;
    a contact imager housed within the housing and having a surface for accepting fingerprint information and for providing a second signal corresponding to detected fingerprint information, the contact imager comprising:
        a source of light for illuminating an object to be imaged so that a light beam derived from said object and carrying its image is formed;
        a prism having a plurality of illuminating surfaces for illuminating said object with said light source and having a plurality of viewing faces corresponding to said illuminating surfaces for transmitting therethrough said light beam derived from said object;
        image focusing means for dividing said derived light beam into a plurality of sub-beams carrying subimages of said object, and for focusing each of said sub-beams on a focal plane; and,
        a plurality of image sensors corresponding to said plurality of sub-beams, each image sensor disposed in a focal plane corresponding to one of said sub-beams, for receiving and converting a corresponding subimage into an electric signal; and,
    means for accepting the first signal and the second signal and for combining and/or multiplexing information from the first signal and the second signal to provide a third signal to the computer.

2. An apparatus for providing fingerprint imaging information and positional information for use with a computer as defined in claim 1, wherein the image focussing means comprises a plurality of lenses corresponding to the plurality of viewing faces.

3. An apparatus for providing fingerprint imaging information and positional information for use with a computer as defined in claim 1, wherein the contact imager comprises means disposed between the viewing faces of the prism and the lenses for preventing light propagating from the prism in the direction of the lens from reaching a portion of the lens about its outer edge.

4. An apparatus for providing fingerprint imaging information and positional information for use with a computer as defined in claim 1 wherein the housing and pointing device form a computer mouse.

5. An apparatus for providing fingerprint imaging information and positional information for use with a computer as defined in claim 1 wherein the means for accepting the first signal and the second signal and for providing a third signal to the computer in dependence upon the first and second signals comprises:
    an analogue to digital converter for converting the second signal into a digital signal; and,
    a microcontroller for accepting the digital signal and the first signal and for providing a third signal to the computer.

6. An apparatus for providing fingerprint imaging information and positional information for use with a computer as defined in claim 5, wherein the third signal is formed by multiplexing the first signal and the digital signal together.

7. An apparatus for providing fingerprint imaging information and positional information for use with a computer as defined in claim 5, wherein the third signal is formed by encoding a variable amount of information of the first signal into the second digital signal according to programming of the micro-controller.

8. An apparatus for providing fingerprint imaging information and positional information for use with a computer, comprising:
    a housing;
    a pointing device housed within the housing and for providing a first signal in dependence upon location;
    a contact imager housed within the housing and having a surface for accepting fingerprint information and for providing a second signal corresponding to detected fingerprint information, the contact imager comprising:
        a source of light for illuminating an object to be imaged so that a light beam derived from said object and carrying its image is formed;
        a prism having a plurality of illuminating surfaces for illuminating said object with said light source and having a plurality of viewing faces corresponding to said illuminating surfaces for transmitting therethrough said light beam derived from said object;
        image focusing means for dividing said derived light beam into a plurality of sub-beams carrying subimages of said object, and for focusing each of said sub-beams on a focal plane; and,
        a plurality of image sensors corresponding to said plurality of sub-beams, each image sensor disposed in a focal plane corresponding to one of said sub-beams, for receiving and converting a corresponding subimage into an electric signal;
    an analogue to digital converter for converting the second signal into a digital signal; and, a micro-controller for accepting the first signal and the second digital signal and for combining and/or multiplexing information from the first signal and the second signal to provide a third signal to the computer.

9. An apparatus for providing fingerprint imaging information and positional information for use with a computer, comprising:
    a housing;
    a pointing device housed within the housing and for providing a first signal in dependence upon location;
    a contact imager housed within the housing and having a surface for accepting fingerprint information and for providing a second signal corresponding to detected fingerprint information, the contact imager comprising:
        a source of light for illuminating an object to be imaged so that a light beam derived from said object and carrying its image is formed;
        a prism having a plurality of illuminating surfaces for illuminating said object with said light source and having a plurality of viewing faces corresponding to said illuminating surfaces for transmitting therethrough said light beam derived from said object;
        image focusing means for dividing said derived light beam into a plurality of sub-beams carrying subimages of said object, and for focusing each of said sub-beams on a focal plane; and,
        a plurality of image sensors corresponding to said plurality of sub-beams, each image sensor disposed in a focal plane corresponding to one of said subbeams, for receiving and converting a corresponding subimage into an electric signal;

an analogue to digital converter for converting the second signal into a digital signal; and, a micro-controller for accepting the first signal and the second digital signal and for detecting a presence of a fingerprint image within the second digital signal received and, when a fingerprint image is detected within the second digital signal, providing the image information to the computer and, when a fingerprint image is not detected, providing the first signal to the computer.

* * * * *